(12) United States Patent
Veazey

(10) Patent No.: US 7,992,509 B1
(45) Date of Patent: Aug. 9, 2011

(54) SHELLFISH HABITATS

(76) Inventor: Sidney Edwin Veazey, King George, VA (US)

( * ) Notice: Subject to any disclaimer, the term of this patent is extended or adjusted under 35 U.S.C. 154(b) by 0 days.

(21) Appl. No.: 12/804,632

(22) Filed: Jul. 26, 2010

Related U.S. Application Data

(60) Continuation-in-part of application No. 11/906,058, filed on Sep. 28, 2007, now Pat. No. 7,762,205, which is a continuation-in-part of application No. 10/731,263, filed on Dec. 8, 2003, now Pat. No. 7,007,620, which is a continuation-in-part of application No. 10/314,099, filed on Dec. 7, 2002, now Pat. No. 6,659,686, which is a division of application No. 09/776,971, filed on Feb. 5, 2001, now Pat. No. 6,491,473.

(51) Int. Cl.
*B63B 35/44* (2006.01)

(52) U.S. Cl. ............ 114/267; 119/238; 405/16

(58) Field of Classification Search ......... 114/264, 114/267; 119/208, 234, 238; 405/15, 16, 405/284

See application file for complete search history.

(56) References Cited

U.S. PATENT DOCUMENTS

| | | | |
|---|---|---|---|
| 517,652 A * | 4/1894 | Mann | 119/234 |
| 984,285 A | 2/1911 | McNellie, Jr. | |
| 1,173,879 A | 2/1916 | Shearer | |
| 1,177,381 A | 3/1916 | Case | |
| 1,229,152 A | 6/1917 | Shearer | |
| 1,247,750 A | 11/1917 | Upson | |
| 1,489,428 A | 4/1924 | Cushing | |
| 1,778,574 A | 10/1930 | Thornley | |
| 1,847,043 A | 2/1932 | Ball | |
| 2,159,685 A | 5/1939 | Buzzell | |
| 2,348,508 A | 5/1944 | Wells | |
| 2,369,615 A | 2/1945 | Smith | |
| 2,390,940 A | 12/1945 | Hull | |
| 2,981,219 A | 4/1961 | Winslow | |
| 3,344,609 A | 10/1967 | Greiser | |
| 3,490,407 A | 1/1970 | Demster | |
| 3,557,742 A | 1/1971 | Gainsley | |
| 3,640,075 A | 2/1972 | LaPeyre | |
| 3,665,882 A | 5/1972 | Georgiev et al. | |
| 3,722,222 A | 3/1973 | Rinkel | |
| 3,802,205 A | 4/1974 | Dickinson | |
| 3,878,806 A | 4/1975 | Garcia | |
| 3,951,085 A | 4/1976 | Johnson et al. | |
| 3,957,098 A | 5/1976 | Hepworth et al. | |
| 3,969,900 A | 7/1976 | Plodowski | |
| 3,974,789 A | 8/1976 | de Groot | |
| 4,067,285 A | 1/1978 | Jones et al. | |
| 4,152,875 A | 5/1979 | Soland | |
| 4,157,695 A | 6/1979 | Knutsen | |
| 4,165,197 A | 8/1979 | Postma | |
| 4,266,509 A * | 5/1981 | Gollott et al. | 119/208 |
| 4,375,928 A | 3/1983 | Crow et al. | |
| 4,440,527 A | 4/1984 | Vidal | |
| 4,607,985 A | 8/1986 | Matsushita | |

(Continued)

FOREIGN PATENT DOCUMENTS

JP 09028232 A * 2/1997

(Continued)

*Primary Examiner* — Lars A Olson
(74) *Attorney, Agent, or Firm* — James K. Poole, Esq.

(57) ABSTRACT

Methods of producing precast concrete structures, installing them to form larger structures along shorelines or underwater and the structures produced thereby are disclosed. Certain preferred embodiments can be employed as underwater shellfish habitats for raising oysters, mussels and the like.

9 Claims, 25 Drawing Sheets

U.S. PATENT DOCUMENTS

| | | | |
|---|---|---|---|
| 4,643,618 A | 2/1987 | Hilfiker et al. | |
| 4,712,944 A | 12/1987 | Rose | |
| 4,820,079 A * | 4/1989 | Wheeler | 405/23 |
| 4,911,585 A | 3/1990 | Vidal et al. | |
| 4,914,876 A | 4/1990 | Forsberg | |
| 4,940,364 A | 7/1990 | Dlugosz | |
| 4,964,750 A | 10/1990 | House et al. | |
| 5,087,150 A | 2/1992 | McCreary | |
| 5,158,395 A | 10/1992 | Holmberg | |
| 5,178,493 A | 1/1993 | Vidal et al. | |
| 5,507,988 A * | 4/1996 | Eagan et al. | 264/122 |
| 5,524,549 A | 6/1996 | Morris | |
| 5,628,280 A * | 5/1997 | Ericsson | 119/238 |
| 5,697,736 A | 12/1997 | Veazey | |
| 5,908,265 A | 6/1999 | Mostkoff | |
| 6,167,827 B1 | 1/2001 | Keehan | |
| 6,491,473 B2 | 12/2002 | Veazey | |

FOREIGN PATENT DOCUMENTS

WO     WO 90/08059     7/1990

* cited by examiner

1=10
VARIABLE SIZE MODULAR STACKING IN FRACTIONAL
INCREMENTS ON SHIP
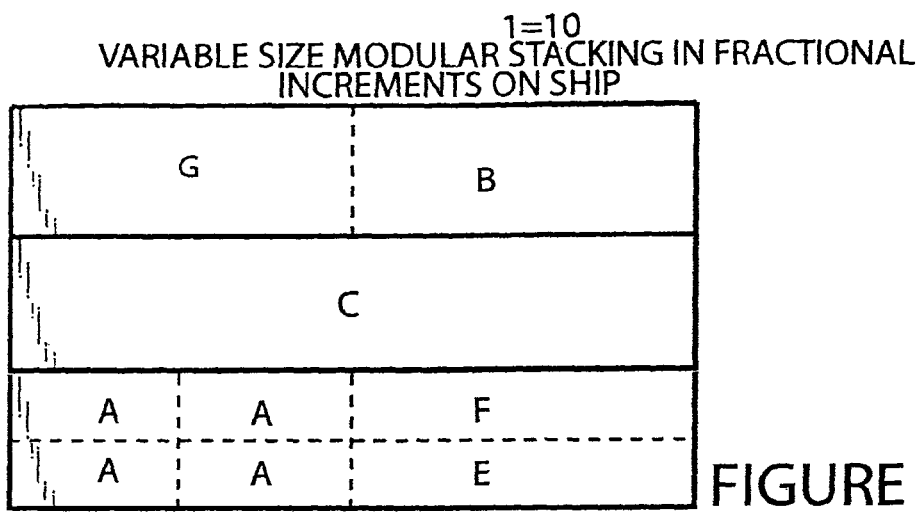
FIGURE 13A
TOP VIEW
FIGURE 13B
SIDE VIEW
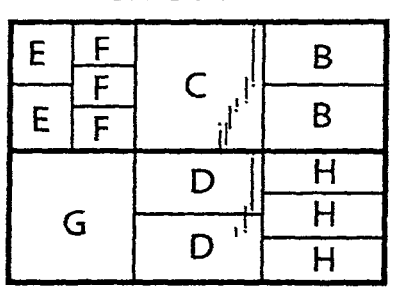
FIGURE 13C
END VIEW
LEGEND
| BOX | WIDTH | HEIGHT | LENGTH |
|-----|-------|--------|--------|
| A | 4' | 4' | 10' |
| B | 8' | 4' | 20' |
| C | 8' | 8' | 40' |
| D | 8' | 4' | 40' |
| E | 4' | 4' | 20' |
| F | 4' | 2'8" | 20' |
| G | 8' | 8' | 20' |
| H | 8' | 2'8" | 20' |

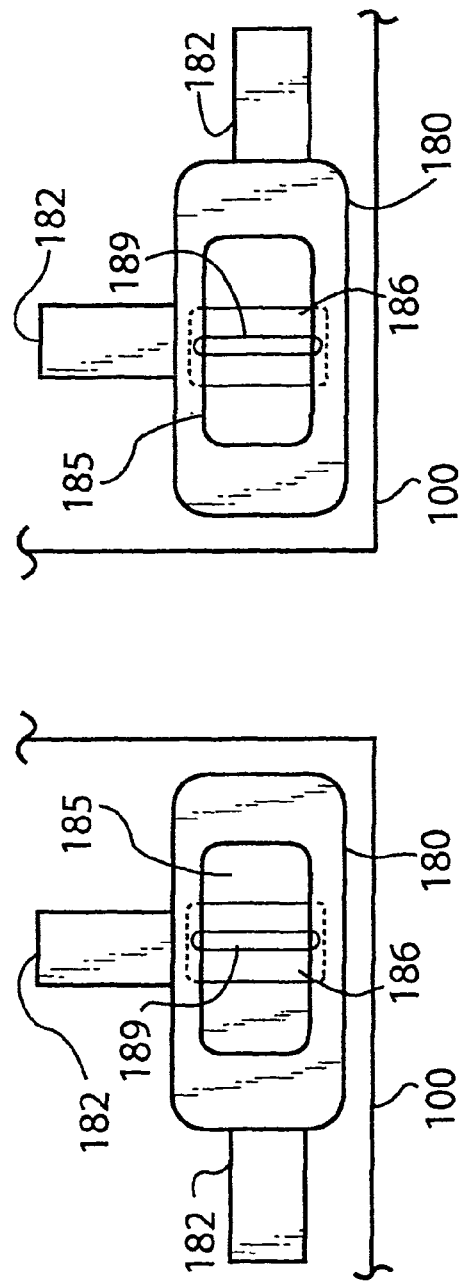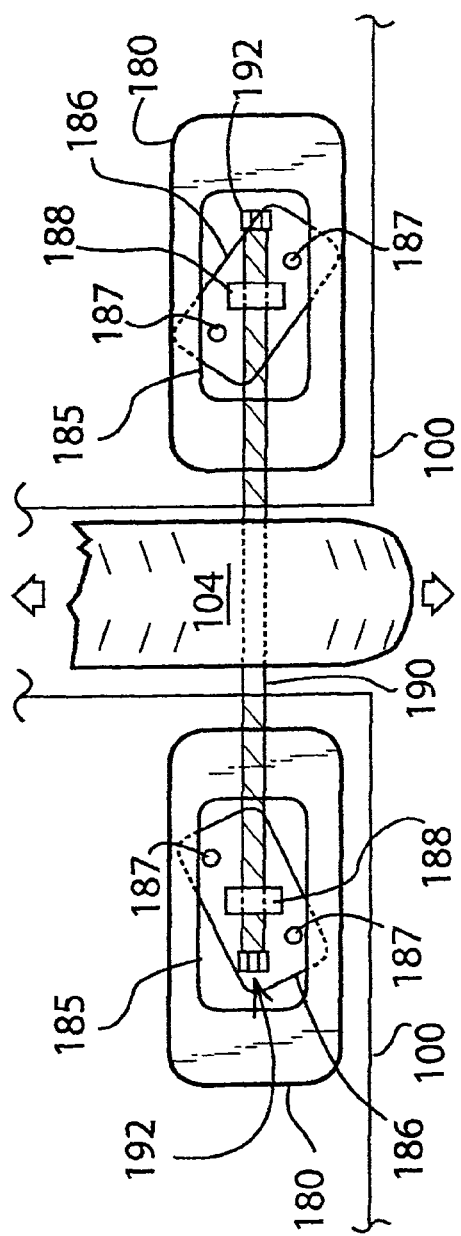

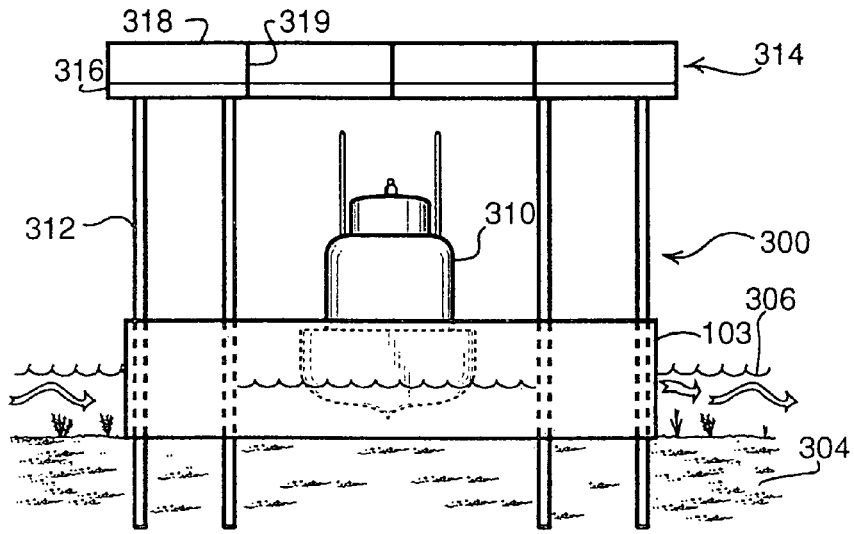
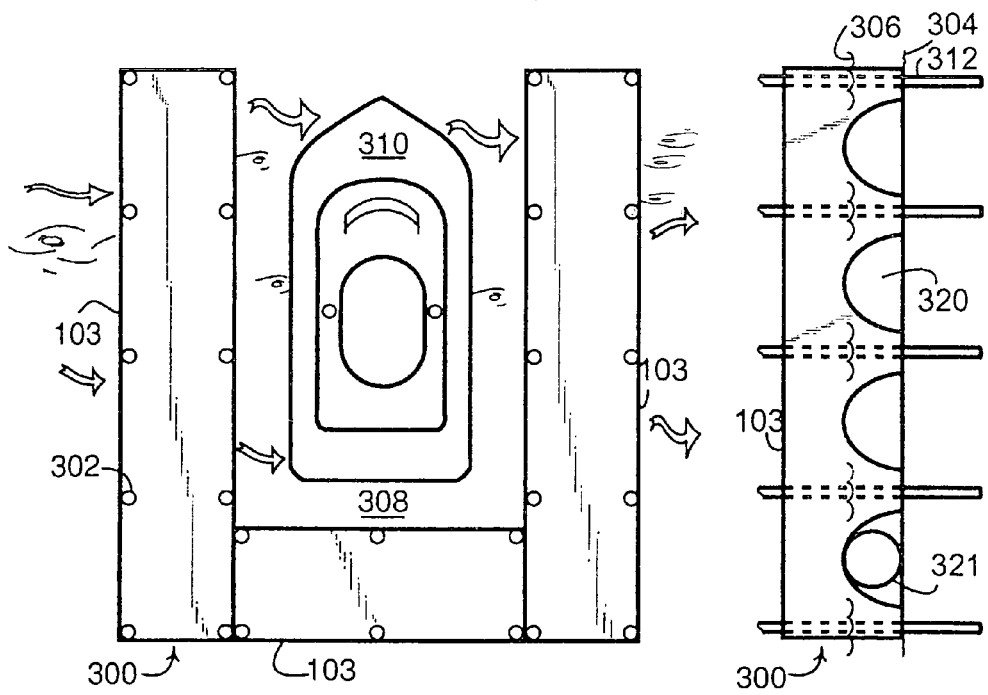
FIGURE 31
FIGURE 32
FIGURE 33

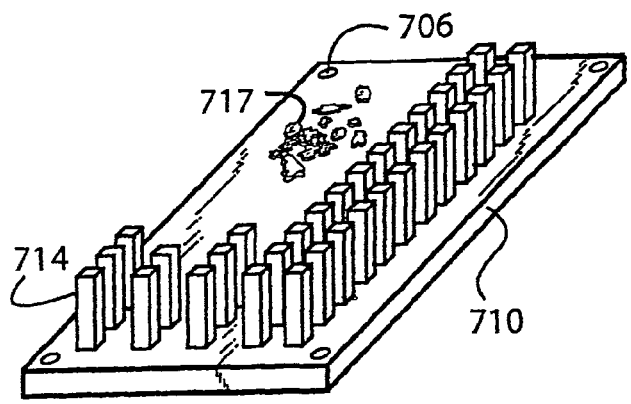
FIGURE 52
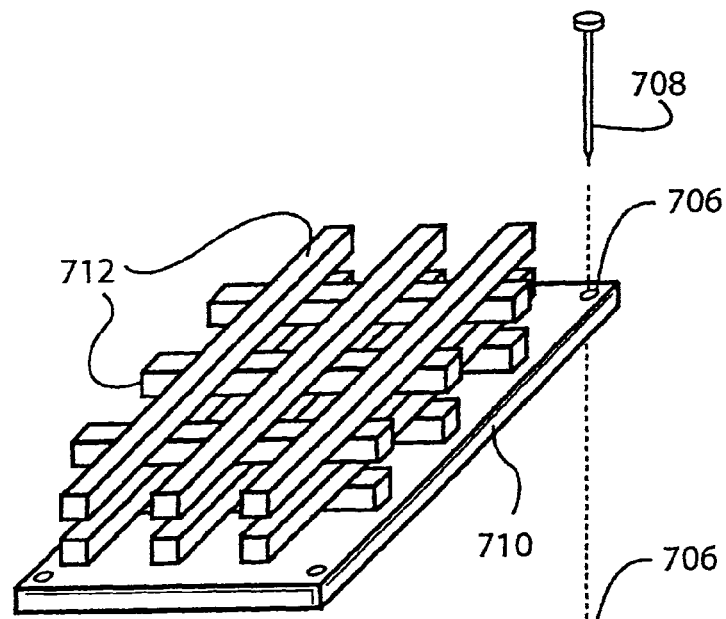
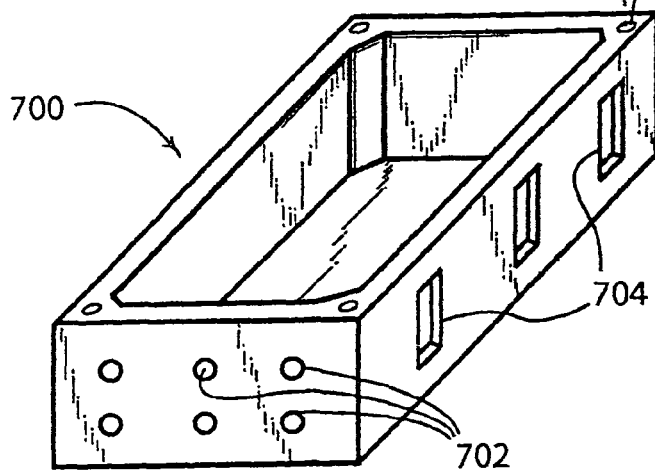
FIGURE 51

SHELLFISH HABITATS

REFERENCE TO RELATED APPLICATIONS

This application is a continuation-in-part of the prior application U.S. Ser. No. 11/906,058 of Applicant Veazey filed on Sep. 28, 2007, now U.S. Pat. No. 7,762,205, issued Jul. 27, 2010, which is a continuation-in-part of Applicant's U.S. Ser. No. 10/731,263 filed on Dec. 8, 2003, now U.S. Pat. No. 7,007,620, which is itself a continuation-in-part of Applicant's U.S. Ser. No. 10/314,099 filed on Dec. 7, 2002, now U.S. Pat. No. 6,659,686, which is a divisional of Applicant's U.S. Ser. No. 09/776,971 filed on Feb. 5, 2001, now U.S. Pat. No. 6,491,473, all of which are incorporated herein by reference in their entireties. Also incorporated herein by reference is U.S. Pat. No. 5,697,052 of Veazey et al.

BACKGROUND OF THE INVENTION

Field of the Invention

This application pertains to precast concrete structures of various sizes and shapes which are suitable for installation as integrated systems to form seawalls and various shoreline reinforcement systems for limiting shoreline erosion by rivers, lakes, oceans, sounds and other major bodies of water, as well as terrestrial structures for terracing, dams, bridges, buildings, etc. It further pertains to structures useful as underwater shellfish habitats.

The patents referred to above provide summaries of relevant prior art. While many techniques have been developed for reinforcing shorelines, as described in those patents and various publications of the U.S. Army Corps of Engineers, there is still considerable room for improvement.

Catalogs of Admiral Marine Co. (Staten Island, N.Y., New Orleans, Oakland, Calif. and Chicago) and Peck & Hale (West Sayville, N.Y. and Kowloon, HONG KONG) disclose various metal fastening devices which could be employed to connect certain components of the embodiments disclosed herein to form structures.

Shellfish such as oysters, clams and mussels have been harvested and cultivated for many years. In early American colonial days, oysters grew in abundance in many areas along the Eastern seaboard and Gulf Coast. In Chesapeake Bay and other areas, oyster "reefs" grew so large and tall that they created hazards to navigation. In the 19$^{th}$ century, oysters were harvested easily in such numbers that they were cheap everyday fare for the common people. In those days, New York Harbor was the world's largest producer of oysters. However, overproduction of oysters led to the introduction of foreign species, which carried diseases reducing native stocks, and pollution resulting from population growth, agriculture and industrialization further reduced oyster populations and production. As an example, the population of oysters in Chesapeake Bay in about 2009 has been described as being only about 2 percent of the numbers pre-1850. Disasters such as the British Petroleum "oil spill" (well blowout) in the Gulf of Mexico in the summer of 2010 continue to endanger oyster populations and production for both short and long term. The *Financial Times* reported on Jun. 20, 2010 that AmeriPure, the "U.S. Gulf Coast's leading oyster processor," had suspended operations down temporarily due to supply shortages blamed upon the massive diversion of small craft to the cleanup of oil. Many fishing grounds and fishing areas have been closed, and oil reaching shellfish beds is expected to have long term adverse effects on bivalves as well as fish and wildlife.

Oysters still provide a major source of food, albeit an expensive commodity in many areas, and their cultivation, harvest, distribution and sales are major economic factors on all three coasts of the United States. Oysters are filter feeders, and thus can reduce water pollution such excessive algae resulting from agricultural runoff. Numerous efforts have been undertaken by the federal and state governments as well as academic and nonprofit organizations to restore oyster populations, and eventually, production in a number of areas. The *New York Times* reported on Aug. 4, 2009 (Science section) that large experimental oyster reefs created ca. 2004 were becoming productive. These structures, created by the U.S. Army Corps of Engineers, have been studied by the Virginia Institute of Marine Science at the College of William and Mary (Williamsburg, Va.). The reefs were built up by dumping oyster shells to form multi-acre layers about 10 to 18 inches high. Compared to previous efforts using lower reefs, providing areas higher in the water column for oyster spat to set and grow keeps them above bottom sediments and appears to keep the resulting oysters healthier. However, as noted in the *Times* article, building and populating oyster reefs on such a massive scale is expensive. Furthermore, due to the limited shellfish production of the present day, oyster shells are limited in availability and must be gathered from many geographically scattered sources. Efforts are underway in some areas to collect oyster shells and recycle them by building reefs. Notably, the South Carolina Oyster Restoration and Enhancement program (SCORE) of the South Carolina Department of Natural Resources has engaged large numbers of volunteers in gathering oyster shells and emplacing them to form reefs, which are then planted with spat and/or seed oysters. Information about these efforts is available via the SCORE website, http://score.dnr.sc.gov.

Despite the use of volunteers, the present limited supplies of oyster shell and limited funding for the collection and transport thereof will prevent the building of new oyster reefs on the massive scale required to restore shellfish populations and production to the levels desired. There is a need for economical structures to provide habitats or bases for oyster reefs, and the embodiments disclosed below can meet such needs.

SUMMARY OF THE INVENTION

An aspect of the present invention is to provide easily transportable construction components which can be used to control shoreline erosion. Another aspect is to provide such construction components as partially-closed containers which are light in weight but can be filled with available liquid or solid materials at the installation site to substantially increase their mass at little cost. A further aspect is to provide construction components which can be filled with solids, gases or liquids to increase their masses when installed as part of a structure, simultaneously serving as sealed storage containers for such materials for later use.

An additional object of the invention is to provide construction components which have the largest masses practicable when filled with ballasting material and installed to form structures. Maximizing the mass of such components is desirable to equip the structures to resist the large forces generated by storm waves, currents, floods, mudslides, earthquakes and other natural disasters. Thus, it is an object of the invention to provide construction components which have ratios of surface areas and installed masses to successfully resist the forces which can be reasonably foreseen for the installation area. A further object is to provide such components which can be connected together when installed to form a structure, thus providing very massive structures which will successfully resist the worst forces of nature with very little acceleration response or damage.

Another object of the invention is to employ recycled materials in the concrete mix where possible to reduce material costs as well as to help protect the environment. For example, fly ash from power plants can be successfully used in various concrete mixtures for casting the construction components. Still another object of the invention is to provide methods of installing precast concrete boxes in underwater positions by transporting them on floating vessels and/or floating them into approximate position and sinking them into their final installed positions. A related object is to provide vessels which are suitable for transporting such boxes, either as deck cargo or as a floating component of the vessel itself.

Yet another object of the invention is to provide shellfish habitats based upon precast concrete boxes which will allow shellfish to grow in underwater areas separated from pollution or silting and facilitate convenient and effective harvesting of the mature shellfish.

In accordance with the present invention, precast concrete boxes of various types, including those disclosed in the previous patent and new versions described below, can be used to form many structures, including sea walls or bulkheads and shoreline reinforcement systems based thereon, which may include such precast boxes and/or other precast components discussed above to form groins, horizontal sections, breakwaters and the like.

Novel systems of precast concrete boxes are provided which generally have the overall form of rectangular parallelepipeds. The boxes can be enclosed on all sides and provided with means for flooding with water and subsequently expelling the water using air pressure or pumping means to raise the sunken boxes. Alternatively, they can include openings such as holes or slots, as disclosed in the previous patent. These and even the precast concrete boxes previously disclosed can be produced in sets, including at least two different sizes and sets of proportions which permit the boxes to be conveniently shipped together by intermodal means of transport and also assembled together to form various structures. The boxes have at least one dimension adapted to fit conveniently into at least one transportation mode such as truck trailers, rail cars and container ships, with a set including a plurality of boxes having at least two different combinations of dimensions and/or proportions. The smaller boxes have at least one dimension which is a whole number fraction of the corresponding dimension of the largest box of the set, which might be termed the "master box". The boxes can be divided by horizontal or vertical partitions into at least two separate inner compartments which can be independently flooded or blown, with valves adapted to equalize air pressure and/or liquid contents between these compartments. In some embodiments, these boxes can have removable concrete tops.

Various types of precast concrete boxes of the invention (and even the prior art) can be assembled to form waterfront structures such as boathouses, either on solid foundations or on floating assemblies of the boxes. With solid foundations, the cutout boxes described above can be emplaced upon the bottom to allow for the flow of water currents.

The enclosed precast concrete boxes of the invention can be interconnected together by mechanical means to form bundles or assemblies like log booms to be towed or otherwise transported over water. Further in accordance with the invention, such interconnected groups of concrete boxes which form a large rectangular mass can be transported by a self-propelled vessel for transporting floating objects which comprises separate bow and stern sections adapted to be fastened together using mechanical means to form the vessel alone. When used for transporting such assemblies of boxes (or other interconnected groups of floating objects such as logs, containers, tanks, floating drydocks or the like), the two sections of the vessel can be separated and connected to the ends of the group of boxes to form a "stretched" vessel in which the group of boxes forms a midship section.

Further in accordance with the invention, certain embodiments of the precast concrete boxes are used to form shellfish habitats, and are cast from concrete comprising crushed bivalve shells. The boxes can have holes and/or slots in the walls, which can be temporarily plugged with knockout sections to facilitate floating the boxes to their intended locations and then sinking the boxes in the water. The boxes are preferably provided with removable concrete tops which can include various projections on one side (which projections are emplaced inside the box during transport, then reversed to face outward and upward during installation) to provide optimum surfaces for young shellfish (e.g., oyster spat or seed oysters) to adhere to. The projections can have the form of cylinders, conical sections or rectangular parallelepipeds, cast integrally with the tops or mechanically affixed thereto. The tops can also be cast with broken bivalve shells (such as oyster shells) adhering to the outer surfaces, to provide natural shell surfaces for the young shellfish to adhere to. Means are provided for removing and hoisting the lids of such shellfish habitats for harvesting, and/or for expelling the water within enclosed versions of the boxes and floating and/or hoisting them to the surface.

In another embodiment, a shellfish habitat comprises a rectangular meshwork container comprising a rigid frame and meshwork enclosure surfaces to retain therein various objects which may provide appropriate shellfish habitat. The container has a shape and size suitable for emplacement atop precast concrete boxes as discussed above, and to accept precast concrete tops fitted with projections for shellfish culture, also as described above. The container and/or cover are fitted with cables or other mechanical devices for hoisting out of the water for harvesting of shellfish.

These habitats can provide attractive combinations of manufactured and natural materials which are floatable, sinkable and can be raised from their underwater positions to check on or harvest oysters or other shellfish. Once the shellfish are harvested, the boxes can be lowered to the bottom again, without disturbing the bottom habitats with dredges or tongs. Using these habitats, the oysters or other shellfish are elevated above the bottom silt and low oxygen content waters where better flow of water and nutrients exists. Efficient harvesting methods using barges and small cranes can be used.

The precast concrete boxes of the invention, including those designed as shellfish habitats, can be installed in the water along a shoreline by sealing all inlets below the expected waterline of the installed boxes, placing the boxes in the water and floating them into position, then opening sufficient water inlets and air outlets to allow the boxes to sink into their assigned places. In preferred embodiments, these inlets and outlets can be opened remotely, and guidance can be provided to the boxes while they are being sunk into position. A group of such boxes can be interconnected and emplaced beneath the water to form a submerged breakwater or reef by positioning the connected boxes atop a flat deck of a vessel, emplacing an anchor on the bottom near the planned installation position and attaching same to a cable slidably connecting the boxes on deck, launching the boxes into the water while the vessel proceeds forward away from the anchor, then maneuvering the boxes into end-to-end contact and clamping the resulting string of boxes into place on the cable, placing the resulting floating string of boxes into position directly above the planned installation position, and finally, sinking the boxes while guiding them into final position by securing the forward end of the cable to a second anchor at the opposite end of the string from the first anchor and applying tension to the cable from the vessel. The vessel used can be a barge, a vessel with a bow door and ramp (such as Navy landing ship tanks, landing craft mechanized, landing craft vehicle and personnel and the like) or a vessel with an after well deck affording access to the water for floating boxes directly into the water (such as a Navy landing ship dock). A container ship with a flat deck and cranes to hoist the boxes from deck level to water level can also be used.

Additional objects and advantages of the present invention are described in, and will be apparent from, the following detailed description of preferred embodiments together with the drawings and appended claims.

BRIEF DESCRIPTION OF THE DRAWINGS

FIGS. 13A, 13B and 13C are plan, side and end views, respectively, of intermodal boxes of the invention arranged on deck for transport.

FIGS. 26-29 illustrate the employment of various connecting devices to connect such boxes.

FIGS. 31-33 are end, plan and side views, respectively, of a waterfront boathouse constructed with precast concrete boxes of the present invention, resting upon the bottom.

FIGS. 51 and 52 are perspective views illustrating shellfish habitats based upon precast concrete boxes of the invention, with two types of removable concrete tops.

DETAILED DESCRIPTION OF PREFERRED EMBODIMENTS

It should be understood that the following description of the presently preferred embodiments of the present invention is merely representative of many possible embodiments and thus is not intended to limit the scope of the invention. In the following description, like structures will be referred to by similar numerical designations.

Figure 1:
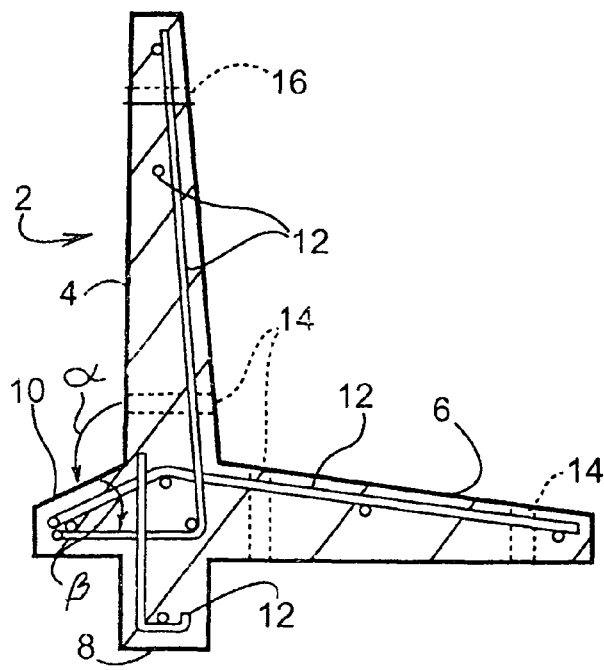
FIG. 1 is a sectional view of a prior art "L-wall" from U.S. Pat. No. 5,697,736.

Referring now to the drawings, FIG. 1 is a sectional view of an L-wall as disclosed in the earlier patent. FIG. 1 illustrates an L-shaped structural member (2) of the above patent, intended for use in retaining walls, seawalls and the like. Vertical wall or stem portion (4) is substantially perpendicular to footer (6), and vertical key (8) extends below the lower surface of the footer, essentially in line with the vertical wall portion. Angular splash plate (10) protrudes from wall (4) opposite footer (6), forming an obtuse angle α downward from the wall and forming an acute angle β with the plane of the footer base. The thicknesses of the vertical wall and footer portions can vary, being thickest near their intersection where stresses are greatest and tapering toward their extremities. For optimum strength, such structural members are cast with fiber or metal reinforcing bars ("rebar") (12) emplaced vertically and horizontally as shown as shown to increase the strength of the member in operation. Holes (14) are preferably formed in the vertical wall and footer portions to provide drainage for liquid collecting behind the retaining wall or seawall. Holes (16) can also be placed to facilitate handling and temporary interconnection of the L-members as well as drainage.

The L-shaped members and other components disclosed herein can be precast by conventional methods known in the art, and in some cases existing commercial components can be utilized to assemble the novel shoreline reinforcement systems of the invention. When the components are to be exposed to salt water, it is preferred that all rebar be at least about 2 inches from any surface of the cast bodies. Fiber reinforcement should be included in the concrete for strength, a relatively high proportion of Portland cement should be used in the mix, and the forms should permit a smooth finish to be obtained on the finished molded objects. The forms should be subjected to vibration, using commercially available mechanisms, after the molds are filled to consolidate the concrete and minimize voids or defects. Preferably, fly ash and other recycled materials should be used in the concrete to the extent it is physically and economically beneficial.

Figure 2:
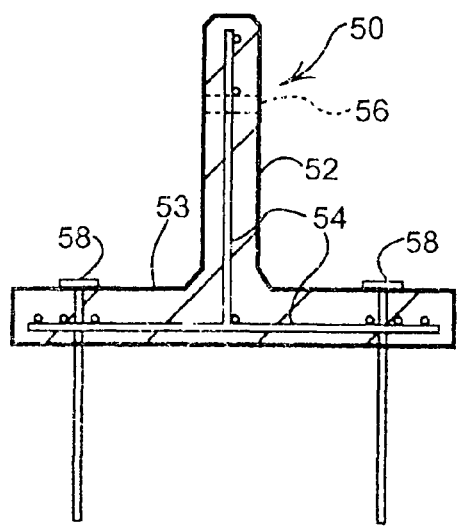
FIG. 2 is a sectional view of an inverted T-shaped unit from the same patent.

FIG. 2 is a sectional view of an inverted T-shaped unit as disclosed in the earlier patent. FIG. 2 illustrates a cross-sectional view of an inverted "T" wall or structural member (50) as disclosed in U.S. Pat. No. 5,697,736, having a vertical wall (52) and a symmetric base or footer (53). Such components can be cast of concrete, preferably containing rebar reinforcement (54) as illustrated above for the "L" walls, in various sizes and proportions to suit the application. For example, for shoreline reinforcement systems exposed to water, such "T" walls can range from about 2 to about 6 feet high and from 2 to about 6 feet wide, the ratio of height to width of the base ranging from about 0.6 to about 1:1. The sections can range from about 6 to about 16 feet in length. Particularly when the installed structures will be exposed to tidal flows, strong currents, surf or pack ice, the width of the base and the lowness of the center of gravity should be emphasized to minimize the risk of tipping. A plurality of holes (56) can be formed in the wall to facilitate handling, some sand and water bypass and interconnection. Similar holes in the base permit the use of pins, harpoon type anchors or stakes (58) to secure the units to the beach.

In the present systems, these inverted "T" walls are used to form groins extending seaward from a seawall or bulkhead, and may optionally be used in rows parallel with the seawall as well, as part of a system to reinforce the shoreline, form a "perched beach" or the like. Such groins are typically installed substantially perpendicular to the seawall and are used in pairs or greater numbers. The spacing and length of such groins must be carefully selected to encourage sand, gravel and other material to collect on the beach. In some cases the effects of groins, seawalls and other beach reinforcement systems can be difficult to predict even after careful analysis. If necessary, the "L" walls and inverted "T" walls described above can be disconnected and relocated. Such analyses are beyond the scope of the present disclosure, but some guidelines may be found in "Low Cost Shore Protection", published by the U.S. Army Corps of Engineers.

Figure 3:
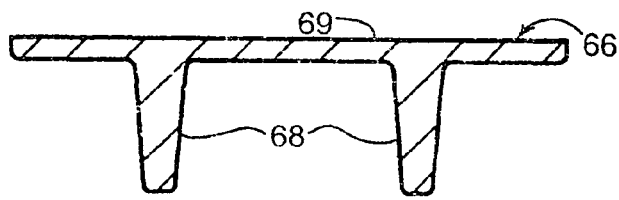
FIG. 3 is a sectional view of a conventional "double T" or pi-shaped unit from the same patent.

FIG. 3 is a sectional view of a conventional "double T" or pi-shaped unit from the earlier patent. FIG. 3 illustrates in cross-sectional view conventional "Double T" cast concrete structural members (66) which may be used in systems of the present invention. Such structural members are used in constructing parking garages. The lengths of such units can range from about 20 to about 60 feet, with length limited mainly by the difficulties of handling such heavy components over the road and along shorelines where they are to be installed. Because of their dimensions, the two tapered upright sections (68) joined to the flat base portion (69) give the appearance of two "T" shapes joined side-to-side. The units are also known as "pi" units because of their resemblance to the Greek letter pi.

Figure 4:
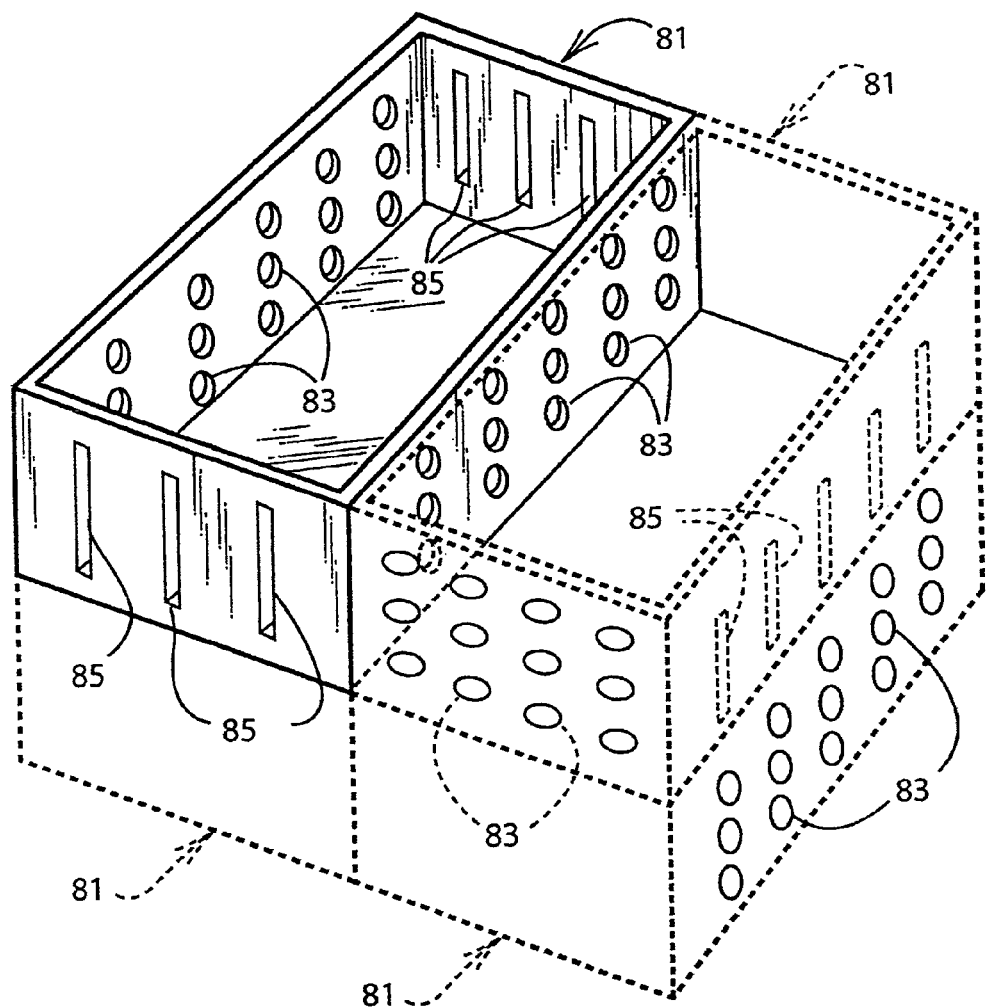
FIG. 4 is a perspective view of precast concrete boxes from the same patent.
Figure 24:
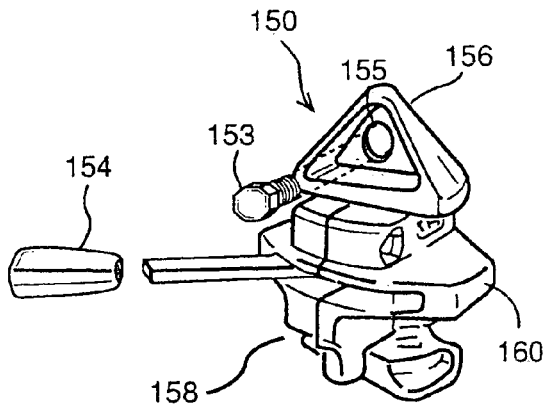
FIGS. 24 and 25 illustrate connecting devices for use with the precast concrete boxes of the invention.

FIG. 4 is a perspective view of a precast concrete box which was disclosed in the earlier patent for use in constructing breakwaters and the like. As an alternative to arrangements of inverted double "T" units to form pier groins, precast concrete boxes of various sizes can be used for various site-specific conditions. For instance, precast septic tank forms come in various sizes, e.g. approximately five feet wide by eight feet long and three feet depth, with walls four inches thick. Concrete boxes made from these existing forms can be used with modifications of openings, stronger and more waterproof concrete, reinforcements, connecting devices and the like, being sunk in position to form the base of pier-groins and the like and filled with water, rocks, sand or rubble. However, preferably they are adapted as shown in FIG. 4 and disclosed in U.S. Pat. No. 5,697,736, where the box (81) has four sides which have been perforated or slotted with circular holes (83) and/or rectangular slots (85) of a few inches diameter or width. This will make the boxes easier to sink and anchor in position. As with the inverted T units shown in FIG. 2, the boxes can have holes formed in the bottom to accommodate anchoring stakes of rebar, screw anchors such as shown in FIG. 24 of the previous patent, or other suitable anchoring means. Preferably plugs are used in the casting molds to form holes (83) or slots (85) which are sealed by thin layers of concrete. Such holes will also make it easier to sink the boxes in the water, as the thin "knockout" portions of the concrete can be punched out once the boxes have been floated into position. Once sunk, of course, it is difficult to refloat such boxes.

Such perforated and/or slotted boxes can serve an additional function beyond anchoring the foundation of a pier groin or other component. Since waves striking the surfaces of such boxes will be partially interrupted or deflected and partially absorbed by passage through at least one side of the box (i.e., the perforations or slots), their force will be at least partially dissipated. The water inside the boxes remains largely restricted or "dead" during the time periods of the waves. Thus, such boxes may be used as "wave degeneration cells" as components of the foundations of pier-groins, groins parallel or perpendicular to the shoreline, or even breakwaters. The dimensions and arrangement of the boxes as well as the dimensions and locations of their perforations and/or slots are of course selected to suit expected conditions. Additionally, these boxes with openings could also serve as protected nurseries for baby fish, crabs, oysters, etc. Such boxes, and other precast concrete boxes described below, can also be used on the sea bed to support racks, baskets or other substrates above siltation levels for shellfish to adhere and grow. Providing such elevated shellfish beds may permit the shellfish to be placed at the optimum depth of water to avoid pollution and siltation and obtain maximum benefit from currents, sunlight and nutrients. The perforations and/or slots should not extend too close to the base, where they might hinder retention and/or accumulation of anchoring material.

Such a breakwater can be built by anchoring a linear array of the precast concrete boxes so as to form a wall either, e.g., five or eight feet wide, then stacking the units as shown in FIG. 4 and lashing or otherwise fastening them together to form a breakwater of suitable height. At least the lower layer of the boxes should be at least partially filled with sand, rock or other anchoring material, but vacancies left in some of the boxes will provide shelter for marine life, thanks to the perforations and/or slots which allow easy access.

Figure 5:
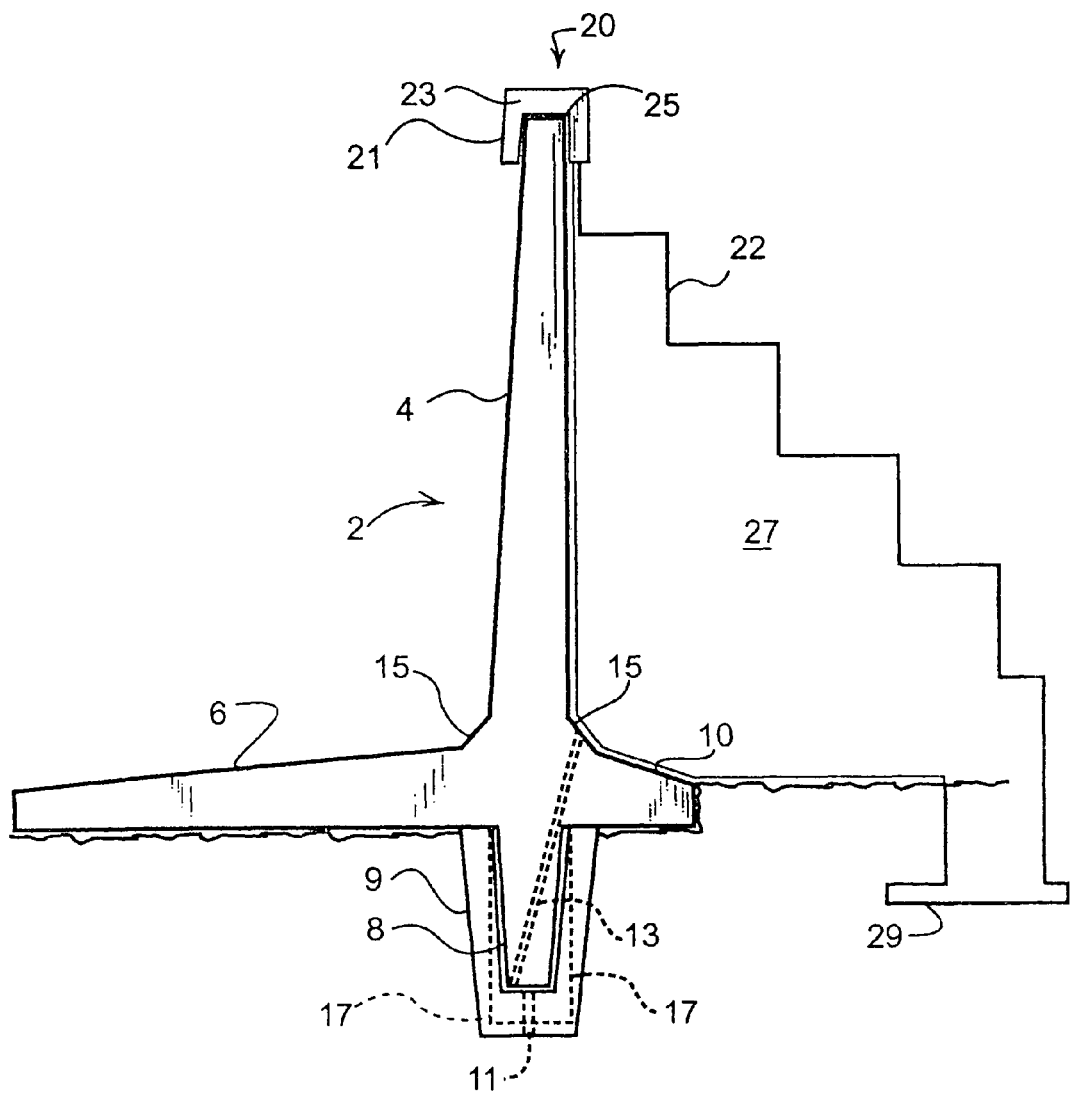
FIG. 5 is a side view of an improved "L-wall" for use in the present invention.

FIG. 5 is a side view of an improved L-wall in accordance with the present invention. Reinforcing bars, drain holes, securing holes and the like can be included as shown in FIG. 1, and are omitted here for clarity. Fillets 15 can be formed of concrete between wall 4 and footer 6 and/or splash plate 10 to increase the strength of the unit and provide more cover for the steel reinforcing bars. L-wall 2 is shown with vertical key 8 placed in a concrete culvert or "trench" 9 of various depths which has been dug, leveled and backfilled to facilitate installation of the L-wall. Pipe 13 is cast into the portion of the L-wall between splash plate 10 and footer 6 to provide a channel for pressurized water (or water-air mixtures) to be used for "jetting" the key 8 into place in sand and/or for flushing the key trench. Only one pipe 13 is shown in this view, but a series of pipes are to be cast into the L-wall along its length to facilitate jetting the unit into the sand which has been cleared of rock and debris. Any suitable arrangement of hoses and/or manifolds can be used to introduce water and/or air through pipes 13 during "jetting in" the L-wall. Such "jetting in" procedures are described in columns 9/10 of U.S. Pat. No. 5,697,736. Another series of pipes 11 are included in trench 9, also to assist in jetting the trench 9 into the sand. Expanded metal or heavy wire mesh is bent into lengths of rectangular reinforcement 17 which are open at one end and cast inside trench 9 to form a reinforcing structure.

Improved L-wall 2 is shown here with a precast concrete tip cap 20 placed atop the vertical or stem portion 4. Tip cap 20 is formed much like a household rain gutter, with sides 21 and bottom 23, and is preferably cast in appropriate lengths to cover the entire length of the L-wall, although they can also be formed in shorter units. Among other uses, such caps 20 can be placed atop a series of L-walls to hold the tops of their stems 4 in alignment. Also shown schematically with this improved L-wall 2 is a set of precast concrete steps 22 cast with cap 20, a precast body incorporating a series of right angles which can form steps when aligned with one side of stem 4 of L-wall 2. When braced on both sides by sidewall unit 27 which are cast on each side of the step ends and contact L-wall 2 on the seaward face, respectively, of stem 4 and splash plate 10. Such a step installation can be conveniently used by persons to climb to the top of the L-wall, which may form a portion of a seawall, bulkhead or the like. Such steps could be placed near the upstream or upcurrent side of a groin, where they would be covered by more sand on the lower steps for stability.

Figure 6:
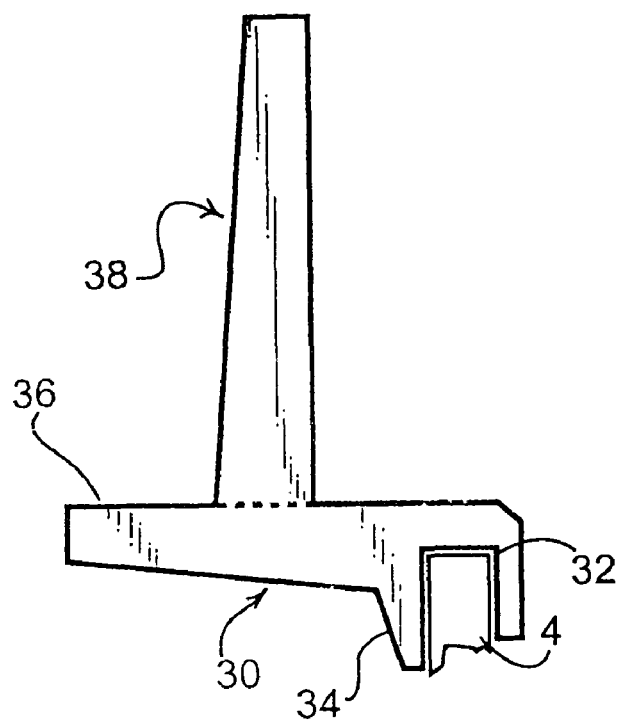
FIGS. 6 and 7 are sectional views of accessories in use with the L-walls of FIG. 5.

FIG. 6 is a side view of another accessory for L-walls 2, namely a precast concrete sidewalk cap 30 having a groove 32 formed therein to fit atop stem 4 of L-wall 2, a cantilever support 34 and a flat walking surface 36 extending to one side of the unit. When L-wall 2 is built into a seawall or the like and the landward side is filled in, such sidewalk caps 30 can be installed atop the L-walls to provide a flat surface suitable for use as a sidewalk or the like. Furthermore, precast concrete terrace retaining walls 38, having a slightly tapered rectangular cross-section, can be cast into such a sidewalk cap 30 to extend the height of the L-walls. This is also convenient for forming a low wall separating a sidewalk or walkway from the seaward side of a seawall constructed of L-walls, if not backfilled. Optionally, retaining walls 38 could be separately cast and mechanically attached to sidewalk cap 30. In addition to providing a flat surface atop a seawall or the like which can serve as a sidewalk, sidewalk cap 30 covers the area immediately behind the L-wall to prevent scour from waves or rain. Terrace retaining walls 38 can be backfilled to provide retaining walls atop sidewalk cap 30, or left freestanding as safety rails.

Figure 7:
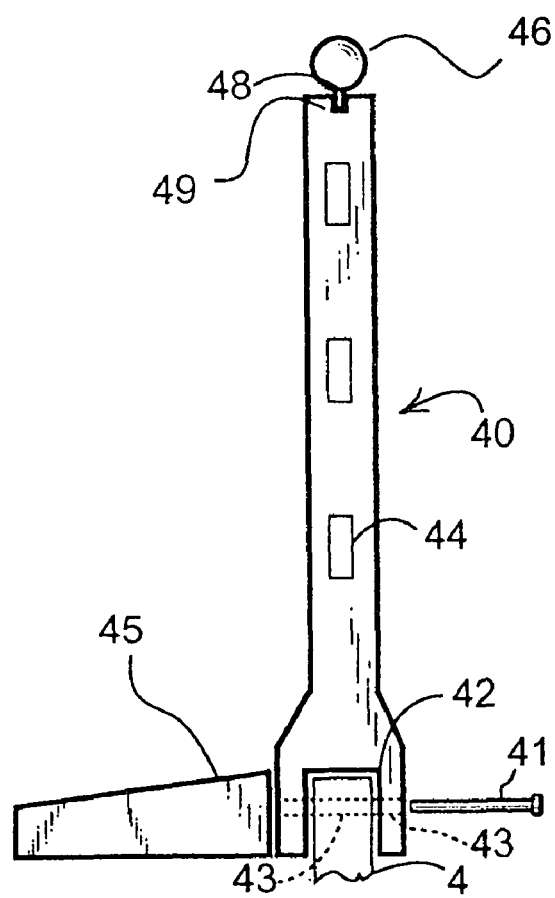

FIG. 7 shows a side view of the top of stem 4 of an L-wall 2 which has been topped with a railing cap 40. Railing cap 40 has a broadened lower end containing a groove 42 adapted to fit the top of stem 4 (as with the sidewalk cap discussed above), and is secured in place by slipping groove 42 over the top of stem 4. Cap 40 can be mechanically fastened to stem 4 by any suitable mechanical means, such as pins or bolts 41 passing through holes 43 in both the base of cap 40 and stem 4. A cantilever section 45 can be added to cap 40, either cast integral therewith or attached by any suitable mechanical means, to add strength and provide a narrow walkway landward of cap 40. As with the sidewalk caps, these railing caps can be fabricated in various lengths, and can be used to keep the tops of the stems of adjacent L-walls in alignment in addition to providing a railing or terrace wall atop an array of L-walls. Railing caps 40 can also be fabricated in much shorter lengths or as posts (i.e., a foot or so in length and width), with railings (not shown) inserted through holes 44 in adjacent units and mechanically secured in place. Optionally, for ornamental and personal comfort purposes, an ornamental railing 46 can be secured to the top of such railing caps by inserting mechanical connection strip (or pins) 48 into groove or holes 49 in the top of railing cap 40. Railings 46 can be made of materials such as wood, metal and polymeric compositions, preferably those which can be made smooth to the touch and durable when exposed to the elements.

The sidewalk, terrace and railing caps described above can be precast concrete as discussed in U.S. Pat. No. 5,697,736, and can be connected together if desired, by mechanical devices also disclosed in that patent.

Figure 8:
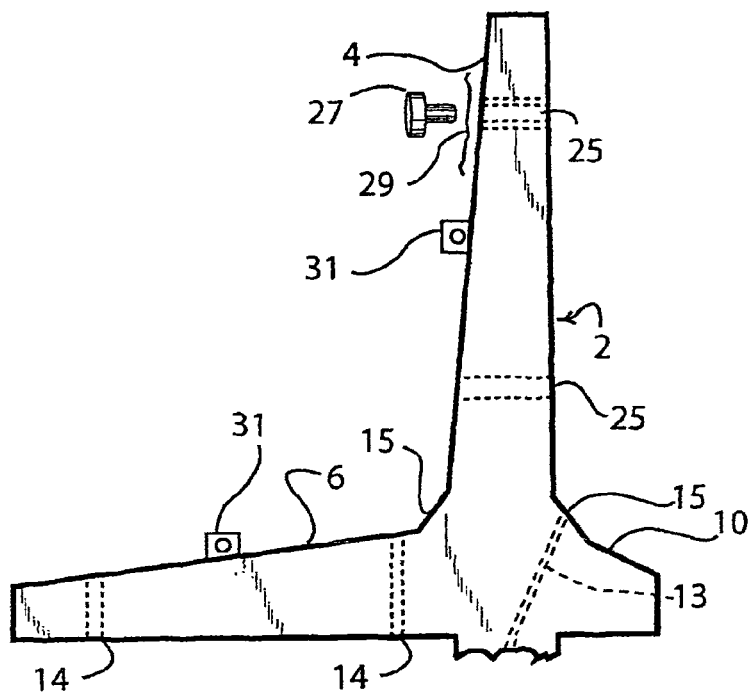
FIGS. 8 and 9 illustrate further refinement of the L-walls of FIG. 5.

FIG. 8 shows a side view of the improved L-wall of FIG. 5, with additional features. Holes 25 are included in the stem 4 of the L-wall during casting, to provide for drainage through the L-wall from the landward side to seaward. These holes can be plugged if necessary (e.g., when L-walls are used to form a dam or dike) with solid plugs 27 (formed of any durable polymer such as polyvinyl chloride), or hollow plugs retaining in place a filter cloth soil retainer 29. Filter cloth retainers 29 are used in lieu of a larger continuous piece of filter cloth or geotechnical material to cover holes 25. If such filter cloth or geotechnical fabric should deteriorate over time, additional solid or hollow plugs could be inserted from the accessible seaward side of the L-wall. Perforated metal or polymeric fittings 31 are cast into stem 4 and/or footer 6 at each end of the L-wall to provide means for interconnecting the L-walls via bolts or other suitable mechanical fasteners. Drain holes 14 can be left open or plugged with solid plugs 27 or hollow plugs with filter cloth, as described above.

The improved L-walls of the present invention can incorporate the extended angular splash plates, disclosed in column 6 of U.S. Pat. No. 5,697,736 and the figures cited, which are incorporated herein by reference.

Figure 9:
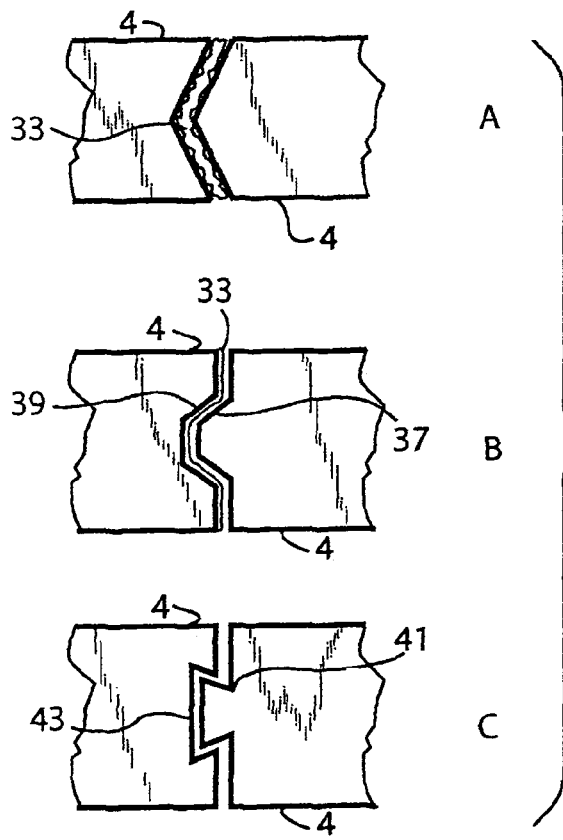

FIG. 9 provides a top view of the stems 4 of two L-walls 2 which are to be fitted together. In A, the edge of the stem 4 at the right is beveled so as to fit into a corresponding groove in the stem 4 on the left, backed by filter cloth for drainage or filled with bead caulk 33 or other suitable material to be inserted between their surfaces to provide a good seal between the two L-walls if used as a farm pond dam or the like. The L-walls of the present invention can be cast with one end of the stem beveled and the other grooved, as described, to facilitate such fitting together during installation. At B, the stem 4 at right has a trapezoidal projection 37 which fits into a corresponding groove 39 in the other stem 4. Caulking material 33 can be used as in A. The C version uses a dovetail method, with projection 41 and groove 43 in the two stems 4, to provide a more secure fit. One L-wall must be lifted to join the two stems in this case, and caulking is optional.

Figure 10:
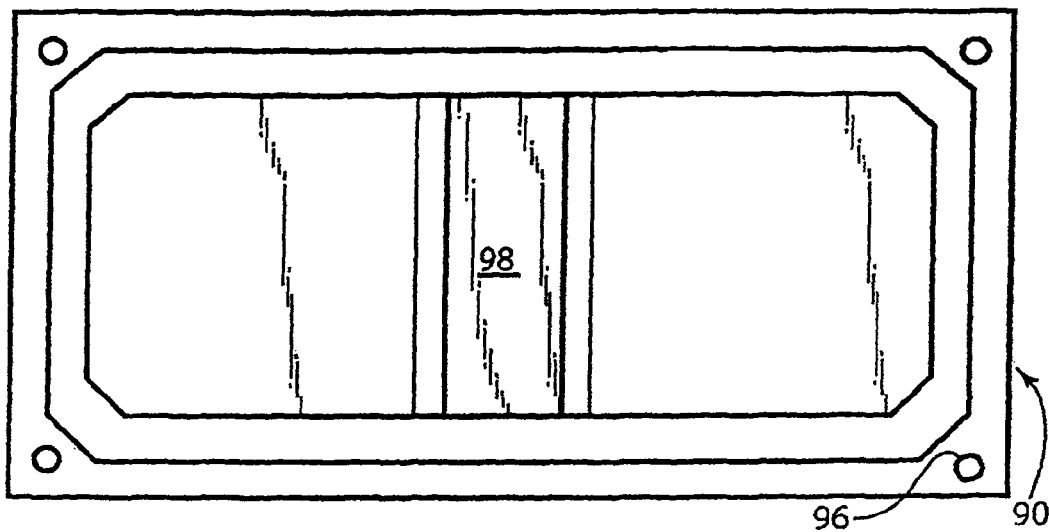
FIGS. 10-12 are plan, side and end views of improved precast concrete boxes of the present invention.
Figure 11:
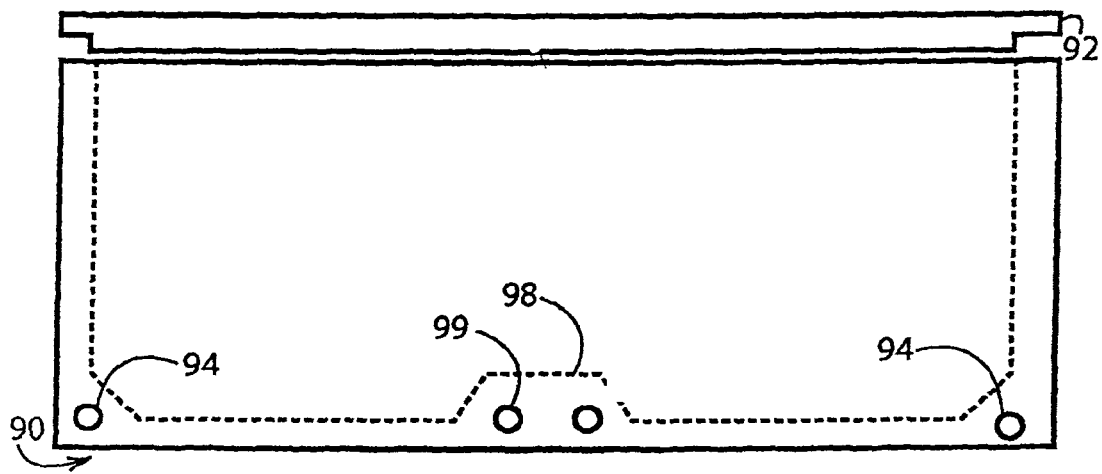
Figure 12:
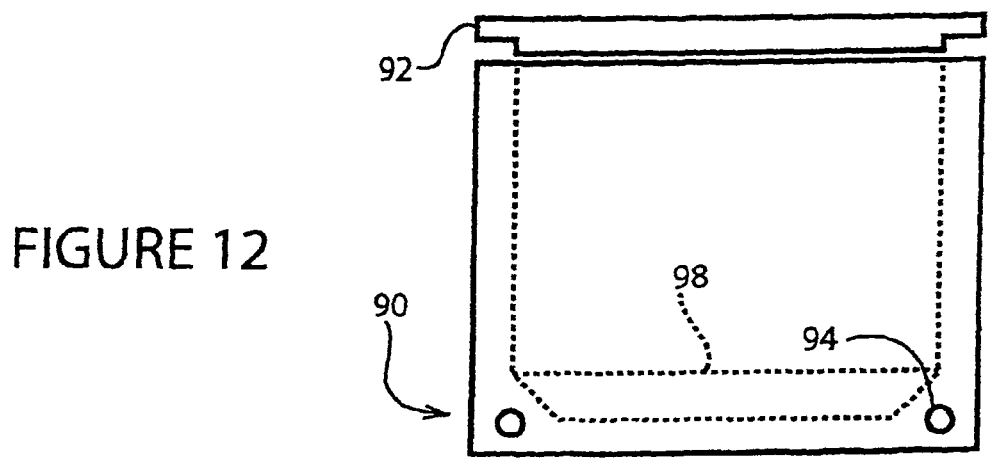

FIGS. 10 to 12 are plan, side and end views of precast concrete boxes of the invention which can be employed on shorelines, underwater and in intertidal zones. The boxes 90 take the form of a simple hollow box of parallelepiped form with sides, ends, bottom and open top, which can be optionally capped with a tight-fitting top 92, held in place by gravity or optional mechanical fasteners (not shown here). Top 92 is omitted in FIG. 10 for clarity. Holes 94 are provided in the lower corners of the sides and ends to be used for connecting cables or rods (not shown here). Vertical holes 96 are provided in each corner of the box at the top to assist in securing top 92 when used or for mechanical connecting devices when the boxes are stacked or secured to the bottom. A low sill 98 on the inside bottom divides the box into halves for connecting overlapping boxes alongside, and holes 99 extend laterally from side to side through this sill to accommodate connecting devices such as cables or rods and also handling means. The boxes shown here are intended to be fluid tight (when capped), in contrast to the boxes of FIG. 4, which are open to the water in which they are immersed. The boxes can be positioned adjacent each other (side-by-side and/or end-to-end) and fastened together using holes 94, 96 and 99 and various mechanical fasteners. When interconnected side-by-side, the boxes are preferably positioned in overlapping fashion (with the ends of two boxes positioned adjacent the center of a third box) to form a stronger structure. These boxes can also be stacked as shown in FIG. 4.

These boxes and those described below are "intermodal" shapes which can be conveniently handled and shipped by at least two modes of transportation, including trucking, railcar and surface water transportation including container ships and barges. That is, they have dimensions (length, width, height) which will permit them to conveniently fit into the allowable spaces in such transport media, either singly or in combination. For example, currently standard containers measuring eight feet square and either twenty or forty feet long can be easily transported by ship, rail and trucks. Furthermore, these boxes can be produced as sets of at least two different sizes, having proportional dimensions which facilitate their use in standard size transportation media and together to form structures such as seawalls and other shoreline reinforcing systems of various sizes.

For example, FIGS. 13A, 13B and 13C provide side, left end and plan views, respectively, of boxes of several dimensions positioned on deck for transport in a space forty feet long and 24 feet wide, with boxes stacked to a uniform height of eight feet. The dimensions of boxes of types A through E are indicated in the legend. Clearly, where boxes having dimensions as large as eight feet square by forty feet long can be conveniently transported, a number of boxes having at least one dimension a suitable fraction (e.g., one half) of these can be assembled to fill the same space for transport. Thus, for an intermodal set of boxes, the maximum dimensions are determined by the maximum space available on deck and/or inside a truck trailer or railcar, and smaller boxes can be designed with similar proportions but having at least one dimension which is, e.g., one half or one third of those of the largest box of the set. In other words, the smaller boxes are produced with one, two or three dimensions which are a fraction (preferably divided by a whole number) of the corresponding dimensions of the largest box of the set, which may be described as the "master" box.

Figure 14A:
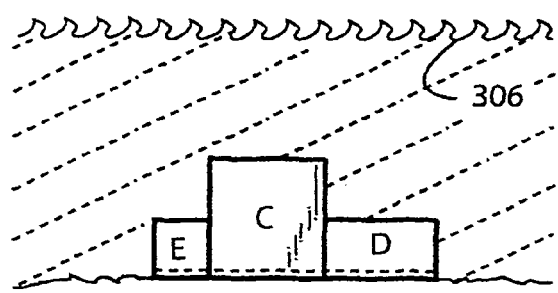
FIGS. 14A and 14B are end and plan views, respectively, of an underwater breakwater assembled of such boxes.

Similarly, FIGS. 14A (left end) and 14B (plan view) illustrate the use of boxes selected from those of FIGS. 13A and 13B to form a structure under the surface 306 of the water. Two "C" boxes with inner partitions 98 are positioned end-to-end.

Figure 15:
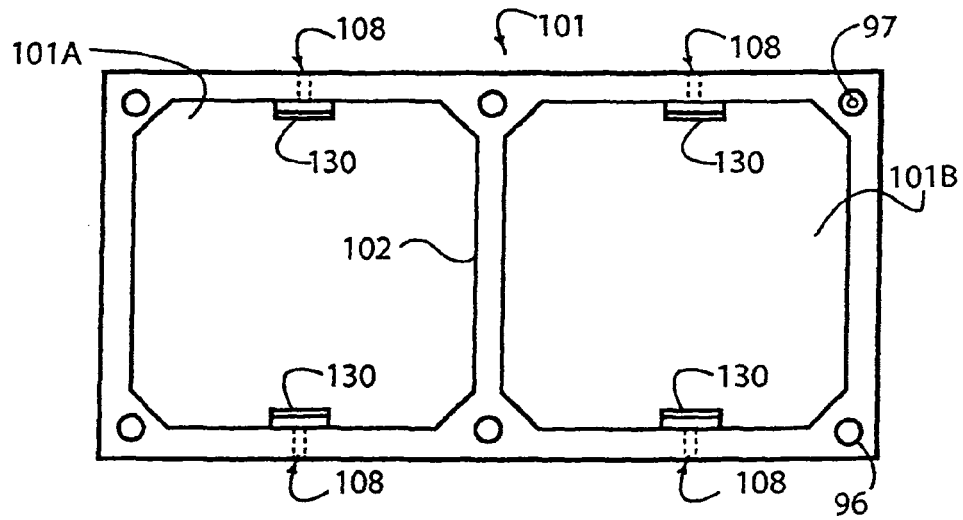
FIGS. 15-17 are plan, side and end views of such precast boxes with provisions for sinking same in water and raising them thereafter.

FIG. 15 is a top view of an improved version of the box 90 of FIGS. 10-12, with a partition wall 102 dividing the box 101 into halves 101A and 101B. The box has the general shape of a parallelepiped, with certain preferred ratios of dimensions which are discussed above. Vertical, horizontal and longitudinal sections of conduit are cast into the walls to form holes 96 in the corners and midpoints of the walls. These formed pipes can be used for reinforcement, lifter and stacking attachment points and post tension cables or conduits for wires or fluids when used as building modules. Slab tops 92 (not shown here, but similar to those of FIGS. 11/12) can be used to seal the boxes. Alternatively, such boxes could be cast in two halves, either top and bottom or front and back portions. Pressurized fluid (water and/or air) could support an internal expendable lightweight form to support the wet concrete being cast atop the cured bottom half to create a unitized watertight structure. Flood and drain holes 108 pass through the sides of box half 101A for flooding or draining, as discussed below.

Figure 16:
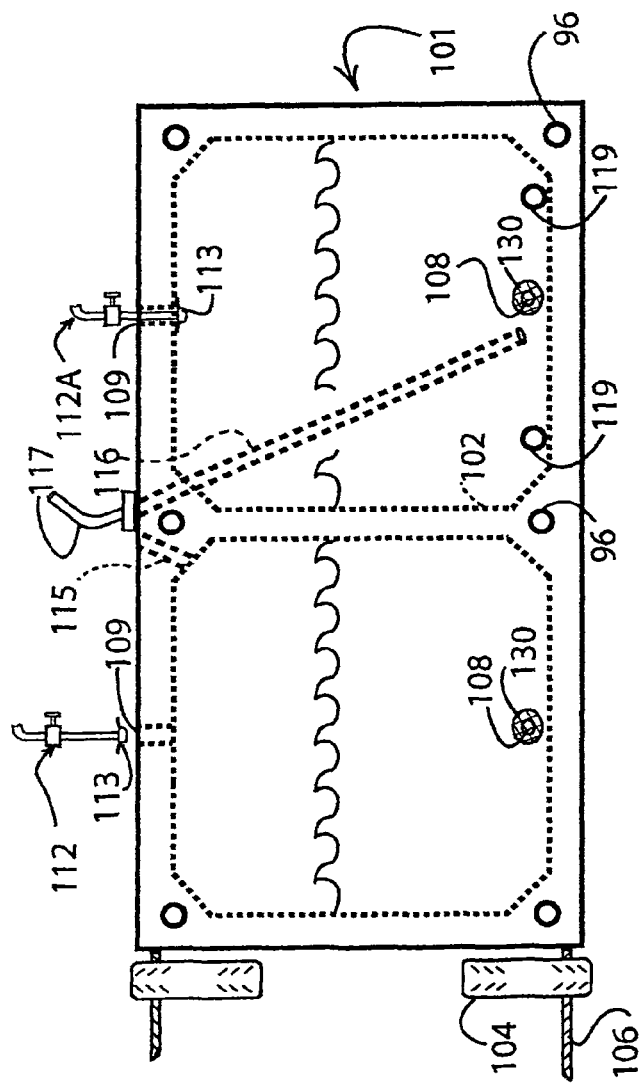
Figure 17:
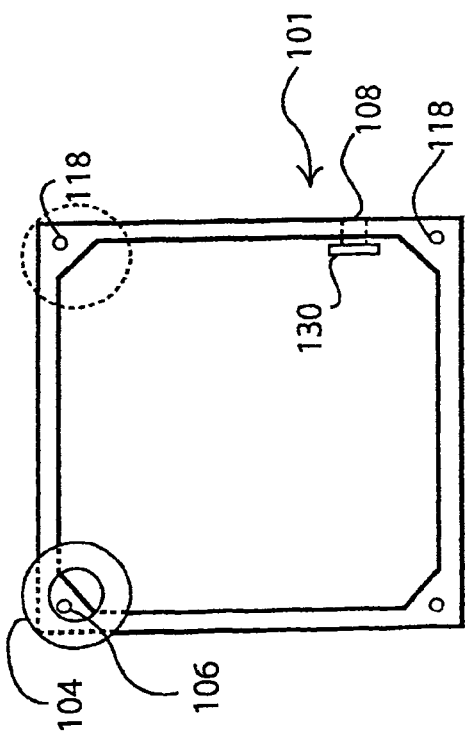

FIGS. 16 and 17 are side and end views of an improved box 101, similar to box 101 of FIG. 15, illustrating devices for flooding and blowing the box when in the water, and for fastening such boxes together to form a structure. The boxes are completely enclosed, including a solid top or top half bolted and sealed with gaskets, elastomeric sealants or other suitable sealing means. Cables 106 are connected to the left side of box 101 through holes 118 in the corners and tensioned to compress a line of boxes together, and are also connected to the adjacent box in an array thereof. Resilient cushioning materials such as used tires 104 are preferably suspended from cables 106 between the boxes to minimize impact damage where desired. Such cushioning materials should be placed at each corner between adjacent boxes. FIG. 17 is an end view illustrating the placement of such tires, using holes 118 in the corners of the box. Flood/drain holes 108 (shown as one method for 101A) at the bottoms of the sides of the box half 101A are penetrated by knocking out a thinner casting of concrete should the box need to be flooded and sunk or later blown and surfaced. These holes are protected by inner grates 130 to keep out gravel, etc. Valve assembly 112 with an expandable washer which seals inside against air pressure, an example of which is shown inserted as 112A, is held in place in blow and vent hole 109, and sealed by a flexible "bayonet" anchor washer 113. An expandable and threaded quick connect blow fitting (shown in FIG. 30) is an alternative. Holes 115 penetrate the reinforced section adjacent to partition wall 102, and can be unplugged and fitted with pipe snap-in connections 116. To flood the box, hose 117 can be attached to the discharge of a pump or inserted into the sea and used as a siphon with hole 108 open, or alternatively inserted [in?] valve 112A open as a vent. To deballast water, this is used if the flood/drain holes 108 are intact and are covered by accreted sand. Also, these holes 115 can be interconnected to equalize pressures between the two sections of the boxes to float level. One end only could be deballasted to raise that end and break the bottom suction forces to surface the box. Alternative flood/drain holes 119 can be included in the bottoms of the boxes, with external plugs which could be uncovered and removed to permit deballasting. The box can be made to float unevenly if needed by partially flooding the portion at the end to be deeper.

Figure 18:
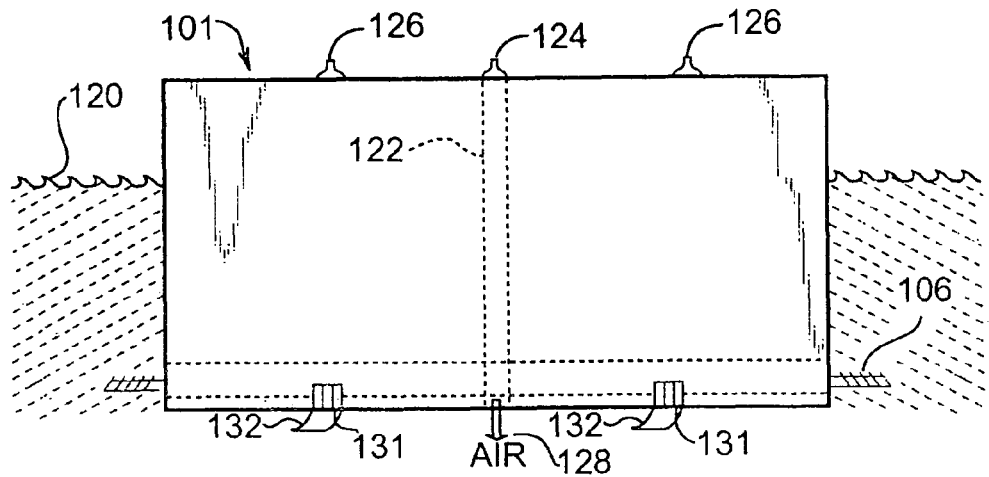
FIG. 18 is a side view of a precast concrete box of the present invention floating near the surface of a body of water.
Figure 19:
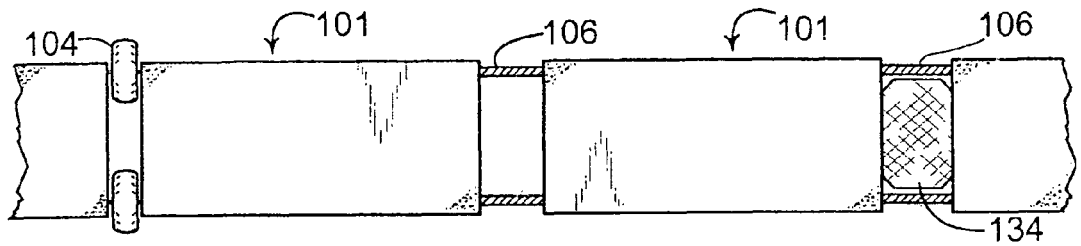
FIG. 19 is a top view of a series of precast concrete boxes connected together to form a structure.
Figure 20:
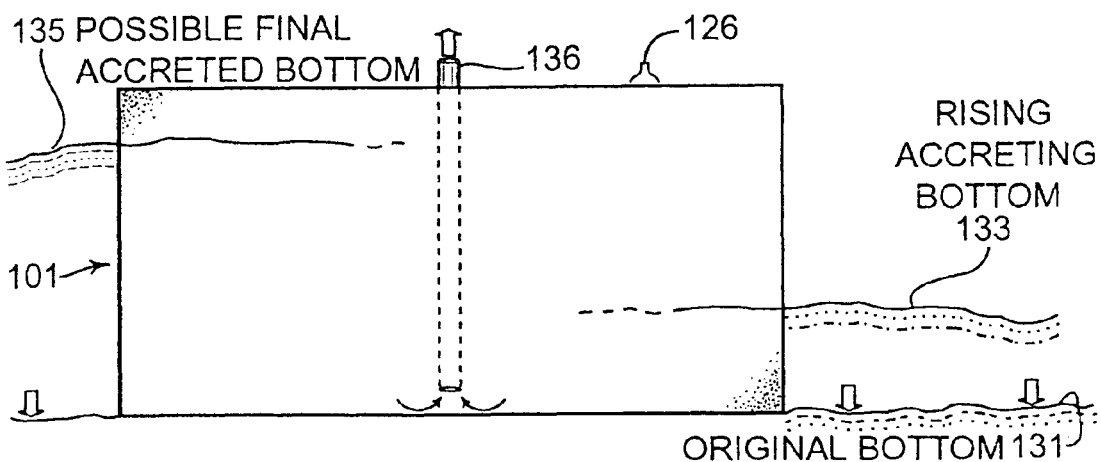
FIG. 20 is a side view of a precast concrete box of the invention which has been sunk to the bottom in a body of water.

FIGS. 18 to 20 illustrate a method of floating single compartment boxes into position and sinking them in place for installation. FIG. 18 is a side view of a box 101 floating near the surface of a body of water 120. Box 101 can be attached to a similar box via cables 106 attached at the corners or passing through holes 118 at the corners (only partially shown for clarity). High pressure blow/vent valves 126 (similar to valve 112 in FIG. 16) are fitted to the top of box 101. As an addition, a septum with an air pipe or simply an air pipe 122 with valve 124 can be used to break suction, and air can be ejected through the bottom at 128. Grated flood/drain check valves 130 are fitted with rubber flapper covers 132 after the box has sunk to the bottom to prevent sand entry, but open when air pressure forces water out of the box for deballasting.

Figure 46:
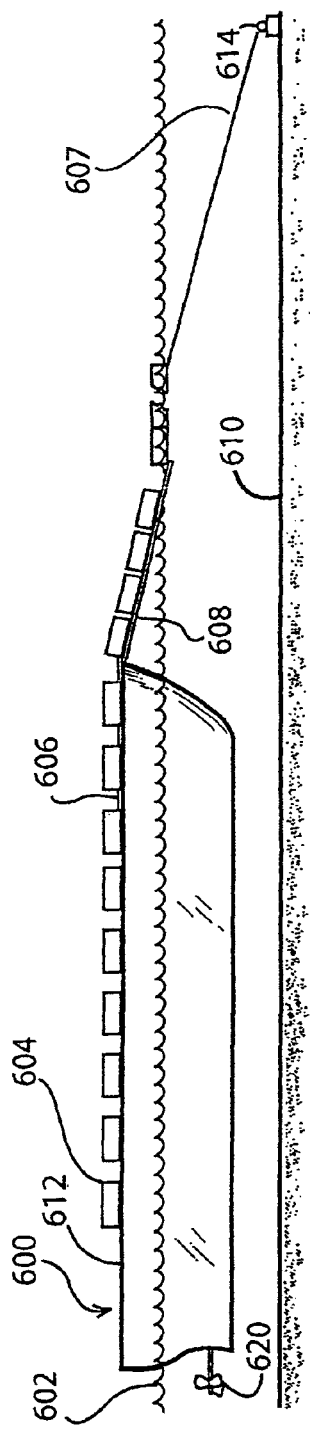
FIGS. 46-48 are side views illustrating the launching of floating precast concrete boxes of the invention from a ship or barge and the sinking thereof to form an underwater structure.
Figure 47:
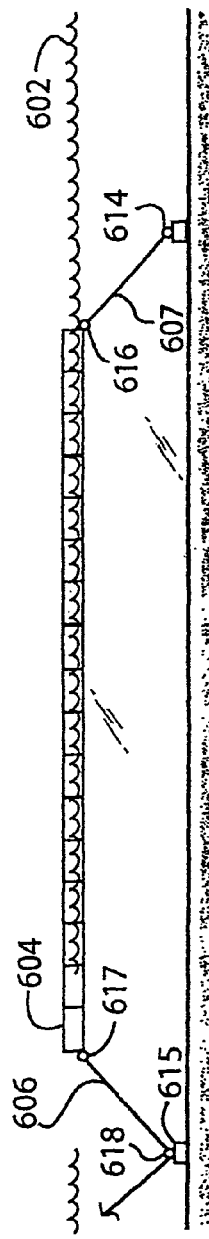
Figure 48:
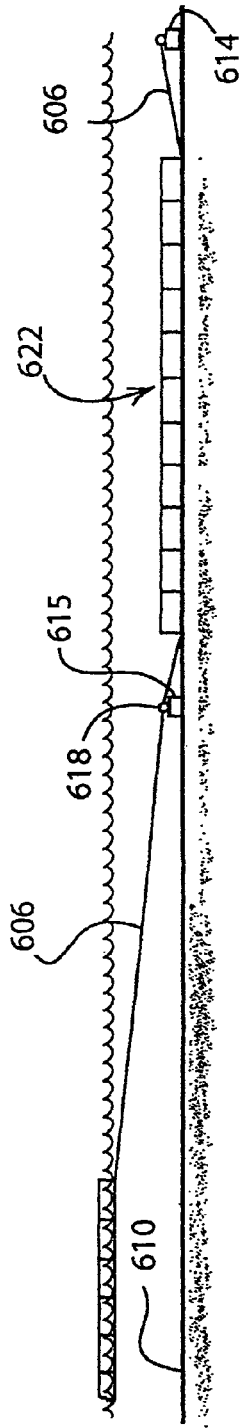

As shown in FIG. 19, several boxes 101 can be interconnected to form an array, with cables 106 and tires 104 between adjacent boxes. Alternatively, larger cushioning materials 134, such as an inflatable fender, rope fender or the like, can be employed. In operation, a single box 101 or an array thereof (FIG. 19) is placed in the body of water near the proposed underwater or tidal installation and moved into position. The box or array can be pushed or towed by tugboats, small boats or any other suitable force. Once in position directly above the proposed installation site, the box or boxes are sunk in place by opening vent valves 126. Hydraulic or electrically operated valves, actuated by suitable signals conveyed by electrical, acoustic or optical (i.e., fiber optics) means, can be opened sequentially for a controlled and coordinated sinking of the boxes. The box or array will normally require some longitudinal restraint or guidance, such as anchors, to ensure that it sinks into the desired spot. Lines tended by anchored boats or divers should suffice for side-to-side alignment of the boxes. Alternatively, anchors and small craft or tugs can be used, as illustrated in FIGS. 46-48.

FIG. 20 is a side view of a box 101 which has been sunk in body of water 120 to rest upon the bottom 131. Rock, gravel, sand and other materials can be added in and around the structure to create great mass inside (if 101 is an open box) and a higher sea bottom around the box or array thereof, as indicated at 133, and with time and tide, additional sand, silt or other materials may collect around the structure to create an even higher bottom surface, as at 135. Also shown in FIG. 20 is a pipe or tube 136 extending from top to bottom of box 101, providing an alternative method of flooding and draining the box. Air can be vented through valve 126 while water is siphoned into or is pumped in through pipe 136 to initiate flooding of the box, until pipe 136 is submerged when air venting through valve 126 will suck water in through pipe 135. Suction can be applied to substantially drain the box when needed, with air admitted through a hose, or while air under pressure through valve 126 will also do the job. Pipe 136 is permanently installed or can be inserted through unplugged precast holes.

Figure 21:
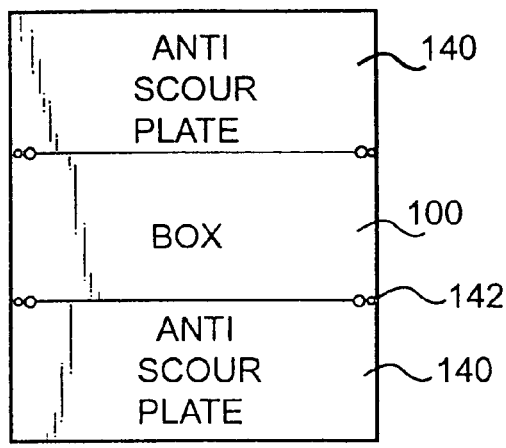
FIGS. 21-23 illustrate anti-scour plates for use with the precast concrete boxes of the invention.
Figure 23:
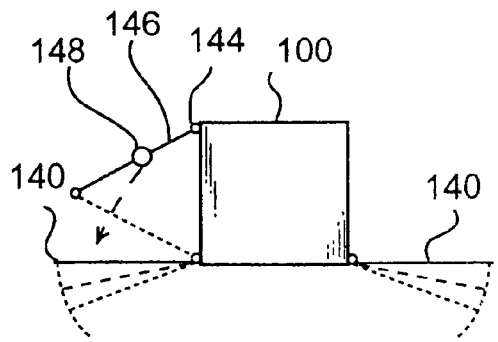
Figure 22:
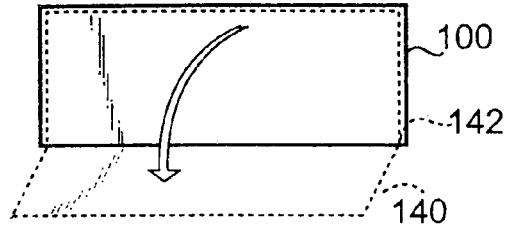

FIGS. 21, 22 and 23 illustrate the use of anti-scour plates in conjunction with the boxes of the invention. As described for the L-walls of the invention in U.S. Pat. No. 5,697,736 at columns 5/6, waterfront structures subject to waves, tidal action or storms may require devices to prevent water from "scouring" or eroding the beach material from under the seaward edge of the structure. FIG. 21 is a plan view showing anti-scour plates 140 attached to both sides of box 100 at the lower edges by mechanical means 142 such as hinges, hooks, rings, cables or the like. When both sides of a box incorporated in a waterfront structure are exposed to water, anti-scour plates on both sides may be required, as seen in FIG. 21. As shown in FIG. 22, when installing box 100, anti-scour plate 140 can be lowered into a position to contact the beach or underwater bottom surface beside the box. Prior to installation, anti-scour plate(s) 140 can be retained in place against the sides of box 100 by suitable mechanical means such as lockable lashing eyes (shown in FIG. 25). As shown in FIG. 23, the anti-scour plates 140 can be raised or lowered into position by any suitable mechanical means, e.g. using cables 146 attached to attachment points 144 and winch 148 (or other hoisting means). Once lowered to contact the beach surface, such anti-scour plates may be covered by deposited sand and gravel or scoured and lowered to a position of stable equilibrium and embed themselves in the beach or underwater bottom surface to prevent water from removing beach material from under the edge of the box. Such anti-scour plates can be formed from precast concrete, corrosion-resistant metals, geotextile materials, polymer composites, or any suitable material which has the required properties of stiffness and durability. The boxes can be shipped with anti-scour plates attached, or the components can be shipped separately.

Figure 25:
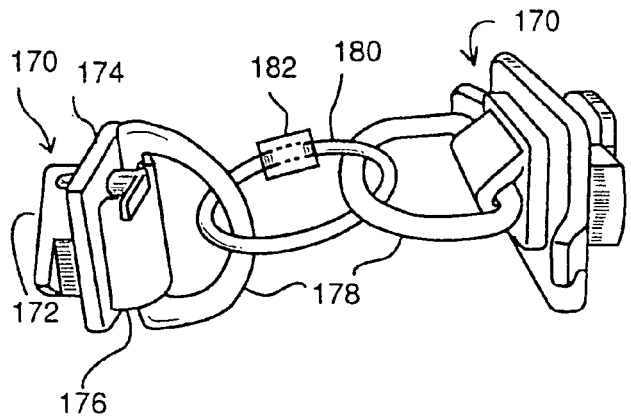

FIGS. 24 and 25 illustrate mechanical attachment means which can be used to fasten such anti-scour plates to the boxes. FIG. 24 is a perspective view of a commercially available "twistlock stacker" used to interconnect containers on container ships. These units include locking plate 158, attached to body 160. Handle 154 is used to manually rotate locking plate 158. To form a hinge, a large bolt 153 can be inserted through eye 155 of one unit and through the eye of a similar unit. The hinge is suitable for one-time uses, as in securing anti-scour plates to boxes.

FIG. 25 is a perspective view of two D-ring lockable lashing eye units 170, having D-rings 178 attached to D-ring hinge 176, which can be attached to boxes 100 by divers, or on the ship before offloading, and linked by mechanical means including chains, U-bolts or detachable links 180, closed by nut 182, to form a hinged attachment of the anti-scour plates to the boxes. The units can include lock 172, and the D-rings 178 are attached to plate 174. Such fittings are commercially available from many marine supply houses.

FIGS. 26 to 29 illustrate methods of attaching adjacent boxes 100 and/or 101 together to form arrays. FIG. 26 is a side view of two adjacent boxes 100, each having a locking plate receptacle 180 cast into the corner of the concrete box and anchored by steel connectors such as reinforcing bars 182. Such units consist of a hollow metal box with smaller racetrack opening 185 embedded in the concrete to receive locking plate 186 of twist lock inserted through opening 185 and twisted. Chains, cables, turnbuckles or other suitable mechanical connecting means (not shown here, for clarity) can be fastened to locking plate 186 to connect the boxes. These connecting means can be used in lieu of or in addition to tensioned cables 106 (see FIGS. 16, 18, 19) for interconnecting the boxes. Such connecting means can be connected onboard the ship or barge before offloading, or by divers on the bottom.

Figure 28:
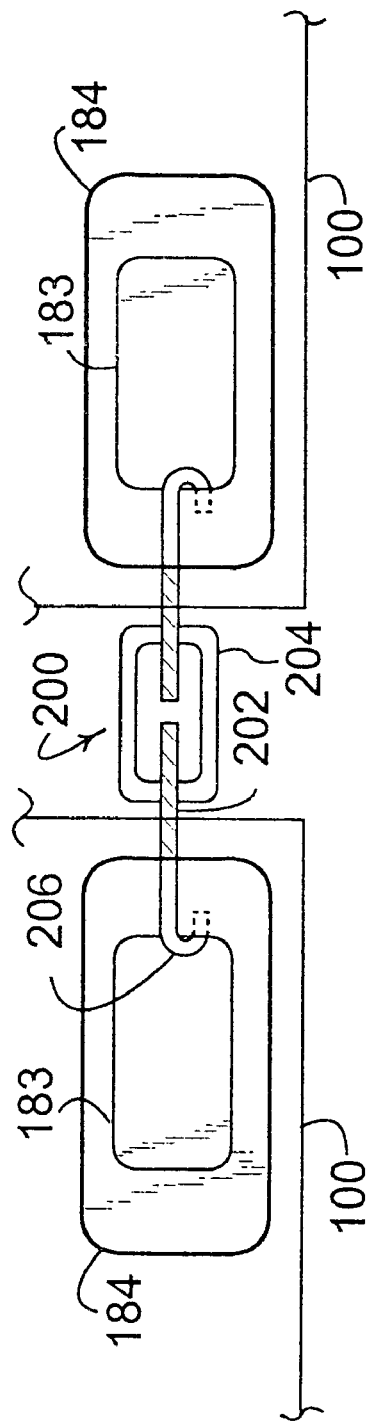

FIG. 27 is a side view of two boxes 100 held together by a differential screw 190 and cushioned by used tire 104 or the like. Female twist-lock locking plate receptacles 180 which are welded to reinforcing bar and cast into the concrete box (same as in FIG. 26) contain an oval or oblong lip and recessed larger opening underneath. Nuts 188 are included and attached pivotally to locking plate 186 through which differential screw 190 can be threaded through a twist-lock lug 188 to fasten the boxes together. Holes 187 in locking plate 186 provide recesses for a tool to apply torque to the lock. Fittings 192 for a power-driven drill socket are provided to tighten differential screw 190 and produce the desired spacing of the boxes and screw tension. FIG. 28 is a side view of a simpler connecting system in which boxes 100 are fastened together by a turnbuckle 200 connecting recesses 187 in bases 184. Many standard commercial turnbuckles can be used, with hooks 206 of turnbuckle screws 202 inserted into recesses 187 and tightened by rotating turnbuckle screw 204.

Figure 29:
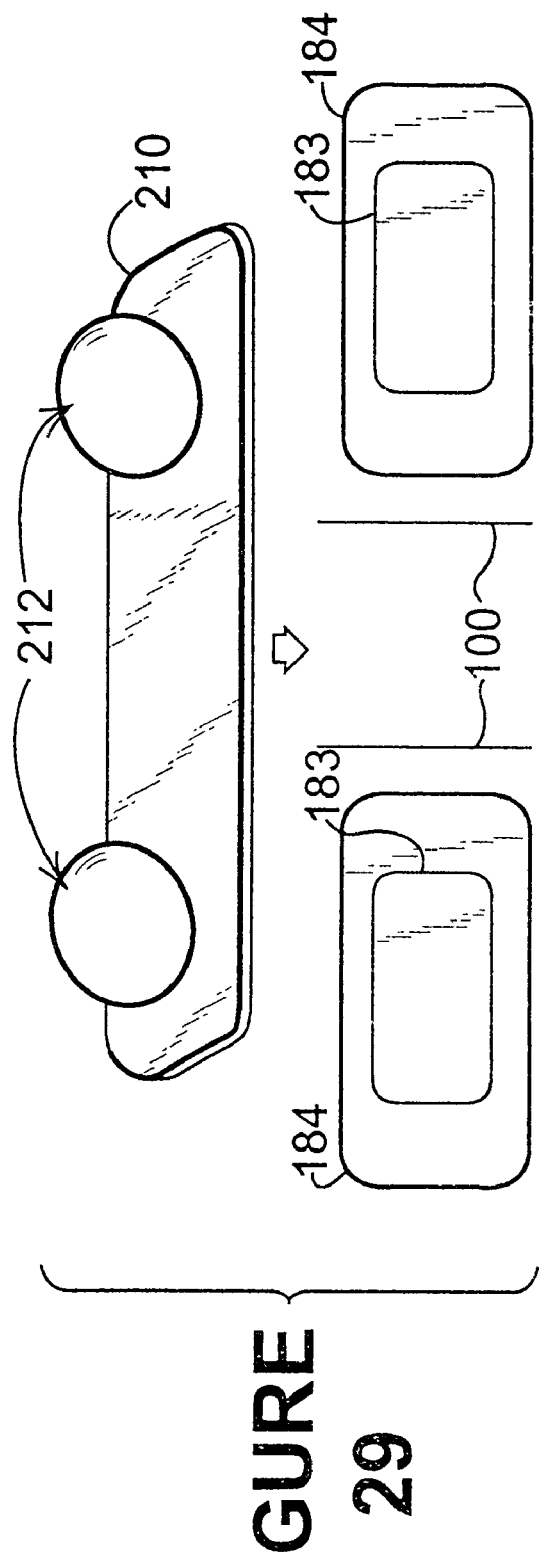

FIG. 29 is a side view of two boxes 100 having recesses 187 in bases 184 installed in each corner, which are to be connected by a strong metal plate 210 (or the like) and two twistlock stackers 212, shown in perspective as attached to the plate. The boxes are connected simply by positioning them the correct distance apart and inserting and tightening twistlock stackers 212 (shown in detail in FIG. 24) into recesses 187 and locking them therein.

Figure 30:
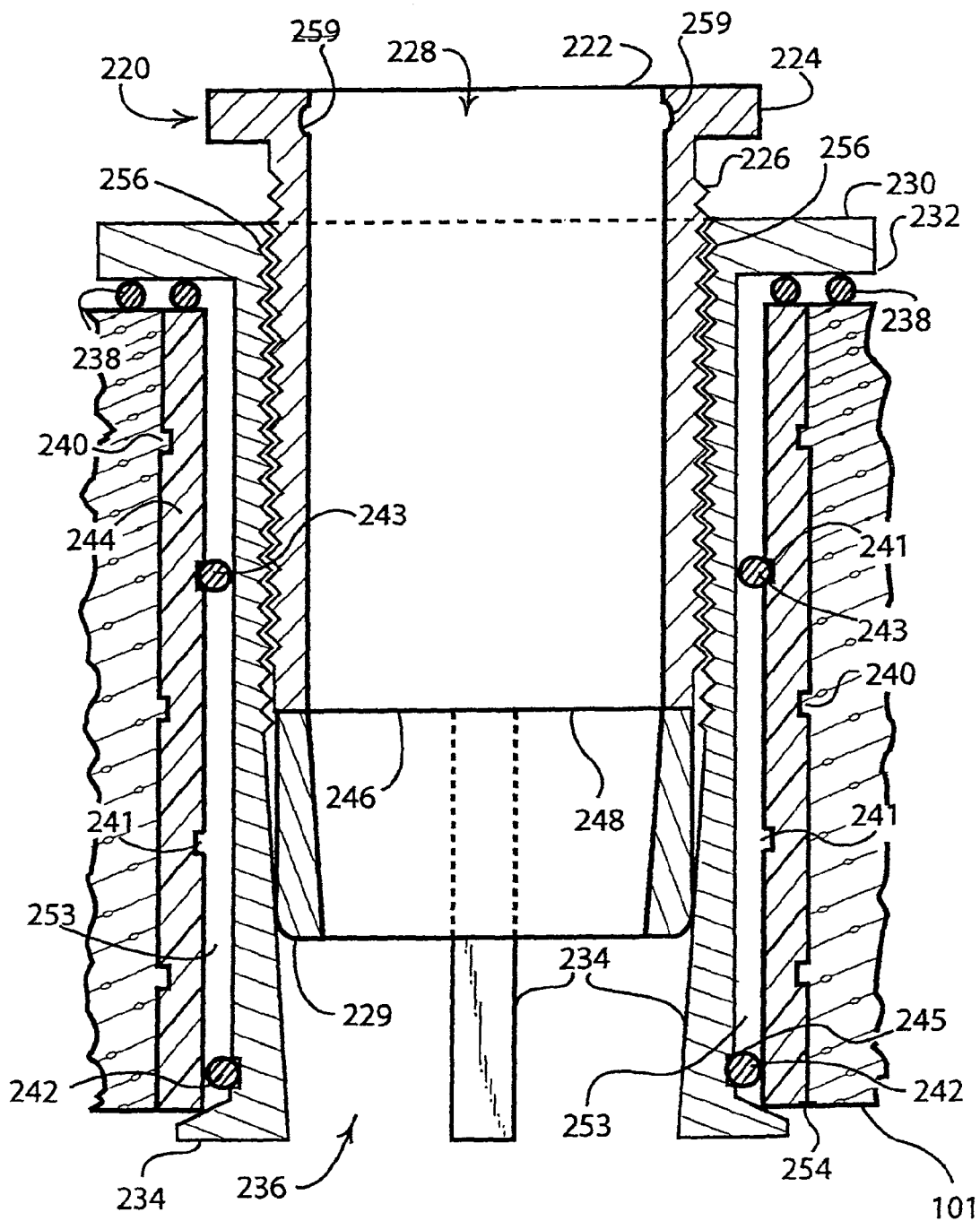
FIG. 30 is a sectional view of a quick connection for an air hose inserted into a hole in the tank which can be employed to refloat the precast concrete boxes of the invention.

FIG. 30 is a sectional view of a quick-connect fitting 220 inserted through a hole 253 in box 100 or 101 (formed by pipe 244 cast in place or placed in hole 254) for venting and blowing. A hole 254 is molded or otherwise formed in the wall, top or bottom of box 101, and is lined with or cast with a polymeric pipe insert 244 which is formed of polyvinyl chloride, another suitable polymer or other suitable material. Grooves 240 in the outer surface of insert 244 will retain part of the wet concrete and bond the insert to the concrete hole if inserted during molding. Grooves 241 on the inner surface of pipe insert 244 can be fitted with elastomeric O-rings 243 to provide a seal between pipe insert 244 and locking fitting 230. A larger tight O-ring 242 fits in groove 245 to provide a force to squeeze locking arms 234 of the locking fitting 230 inward to allow a fit into pipe insert 244. Locking fitting 230 is fitted with top flange 232 and locking arms 234. Additional O-rings 238 are fitted between top flange 232 of locking fitting 230 and the concrete wall of box 101 and pipe insert 244. Locking fitting 230 is formed so that the upper portion of its inner aperture is threaded (256) and the lower portion of this aperture has a smaller diameter than the threaded upper portion. This allows unthreaded cylinder 229 to fit through locking fitting 230. Inner spreader insert 222 has a top hexagonal flange 224 and is externally threaded (226) to be screwed into threaded aperture 256 of locking fitting 230. Inner spreader insert 222 has a lower, unthreaded cylinder 229 which contacts the tapered insides of the locking arms 234 of locking fitting 230 when it is screwed in and spreads the locking arms 234 to contact pipe insert 244 with a cam action to lock and compress O-rings 238. With the quick-connect fitting secured and sealed to box 100 or 101, an air line with shutoff valve (not shown) can be inserted into hole 228 and locked into groove 259 to form a quick connect coupling to permit air to blow the water ballast out of the box or connect to vent valve to contain air to float the box or release air to permit flooding and sinking.

FIGS. 31 to 33 illustrate the use of such concrete boxes to construct a waterfront boathouse. Plan view FIG. 32 (without roof deck 314 for clarity) shows three or more concrete boxes 103 of suitable size and proportions assembled open side up, optionally fitted with concrete or wooden tops (e.g., as shown in FIG. 12) upon the bottom 304 of a shallow harbor or other body of water 306 in a U-shaped configuration forming a mooring area 308 to shelter a boat 310. The upper surfaces of the boxes 103 can be fitted with standard mooring fixtures and the like (not shown here), and allow passengers to easily embark and debark on or from the boat. As shown in end view FIG. 31, boxes 103 are higher than the depth of water 306, but for deeper water or locations where minor tides occur, boxes 103 can be stacked two or more layers deep to provide an upper surface which will lie above the highest normal water level. Holes 302 are provided in the closed bottoms and/or tops of boxes 103, or alternatively outside of the boxes, to accommodate pilings 312, which are driven into bottom 304 to retain boxes 103 in place. The boxes can also be interconnected by mechanical means, as discussed above.

The pilings are hollow tubes of metal or plastic pipe, which are filled with concrete when all boxes and pilings are in place to provide permanent structural strength. Since the main strength is provided by the concrete thus cast, the material for the pipes is not critical, but they are preferably made of durable plastic materials such as PVC so that they will not corrode. The boathouse structure here is emplaced with the closed end toward the shore (with normal walkways or the like provided for access, but not shown here) and the open end toward the water for boat access. The closed end of the boathouse is shown in FIG. 31.

Optionally, a roofdeck 314 can be provided, comprising a solid deck 316 perched atop pilings 312 and secured in place mechanically. Roofdeck 316 can also be of precast concrete of suitable thickness such as precast sections spanning the distance between pilings 312 and any necessary supports, wood, recycled plastic "lumber" or any suitable building material. Preferably roofdeck 314 includes an open railing 318 suspended from posts 319 for safety, and is provided with access by stairs or ladders (not shown) for use by the owners. Movable or fixed side curtains or other closures such as fixed walls (not shown) can be provided for privacy and protection of boats using the structure.

Since such a structure with completely solid sides underwater could be vulnerable to scouring and forces exerted by local currents, as shown in FIG. 33, arched passages 320 and/or pipes or culverts 321 are cast or cut into the sides of boxes 103, extending approximately as high as the expected water level 306, to allow any currents to flow through as indicated by arrows in FIGS. 31 and 32. These boxes are preferably cast with a solid surface extending along arch 320 to provide a bottom of the box to hold sand which can be added for ballast. A flat bottom can also be included to spread the weight of the structure over a larger area, and the structure can also be mechanically attached to piles 312 for support to prevent settling.

Figure 14B:
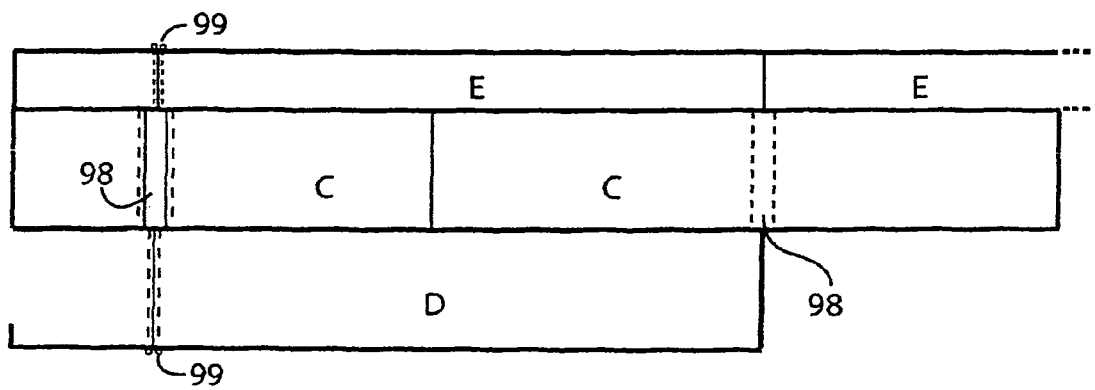
Figure 34:
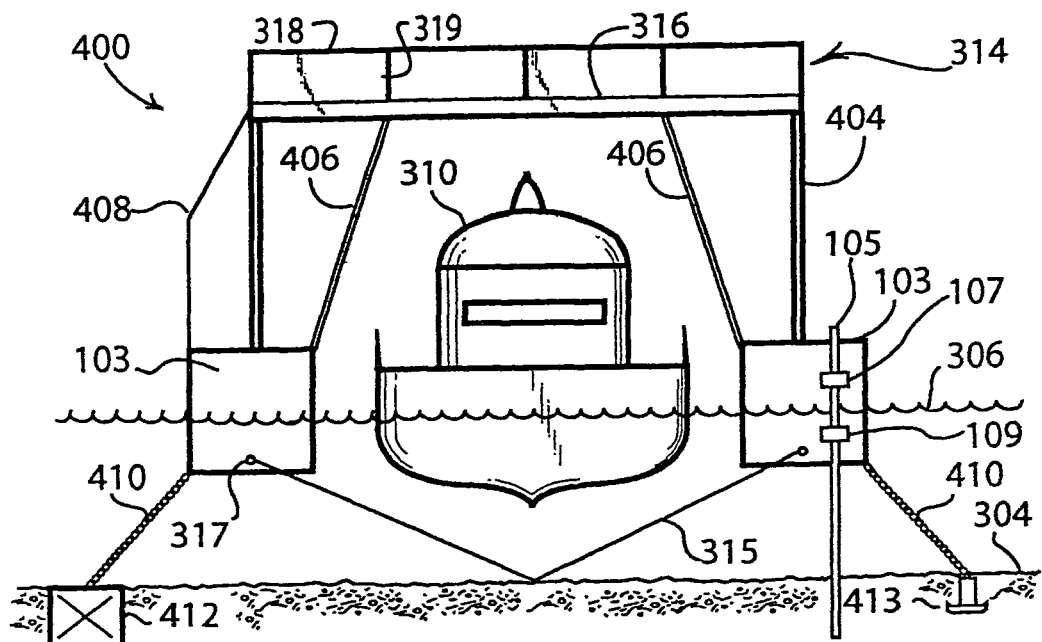
FIGS. 34 and 35 are end and plan views of a larger floating boathouse constructed using three large precast concrete boxes of the invention.
Figure 35:
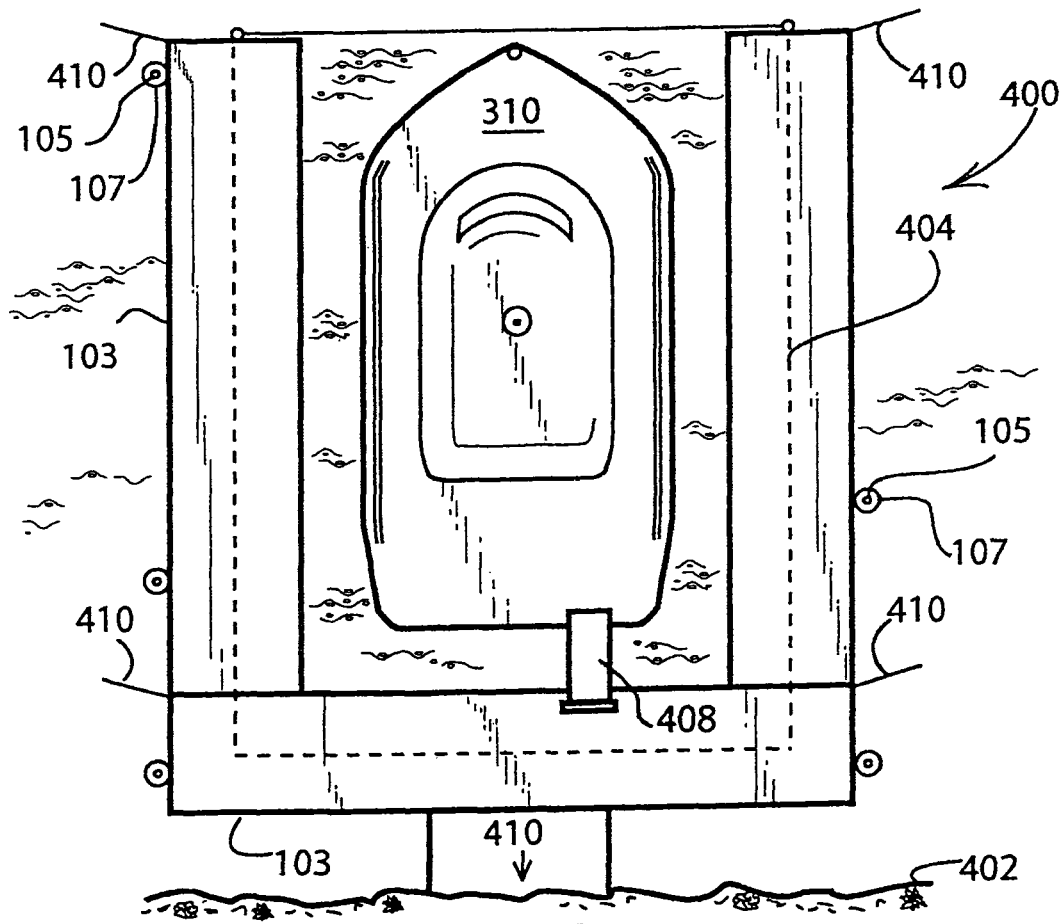

FIGS. 34 and 35 are open end and plan views of a floating boathouse 400 employing enclosed boxes 103 of the invention. Boxes 103 are again assembled to form a U-shaped structure to accommodate a boat 310 therein. The boxes are interconnected by suitable cables or connectors as shown in FIGS. 26, 27 and 28. Boxes 103 float in water 306 adjacent to shoreline 402. The boxes can be completely precast or enclosed by adding precast concrete covers as described in FIGS. 12/13 or decks of wood, recycled plastic lumber or the like. To help the boxes to float, they can be sealed to retain air, can be compartmented as shown in FIG. 14 or filled with foam, ping-pong balls, Styrofoam packing materials or other buoyant materials. Intermodal-sized boxes which measure eight feet square by forty feet long can conveniently be used. Boathouse walls 404 are erected upon the upper decks of boxes 103 to form a boathouse structure thereon. Walls 404 are preferably strong weight-bearing solid walls (using suitable construction materials discussed above) to support an optional deck 314 as described above, but can be cut out to form windows, doors, etc. Roof deck 316 supports rails 318 supported by posts 319. Beams 406 extend from the inner upper edges of boxes 103 to the lower surface of roof deck 316 to increase strength and rigidity. The top decks of boxes 103 can be fitted with appropriate mooring fixtures for boat 310 (not shown here). The boathouse itself can be secured to bottom 304 by standard mooring systems such as a four point moor, chains 410 to clump anchor 412, or screw anchors 413. The boathouse can also be retained in place by a number of piles 108 passing through rings or brackets 109 which are attached to the sides of boxes 103. Ramp 408 or other suitable means can be used to provide access from the deck of box 103 to boat 310. Similarly, optional pier or walkway 410 connects the floating boathouse to land 402. Two or more rigid spacing bars 315 are provided between the arrays of boxes and mechanically attached at 317 to keep them in alignment.

Figure 36:
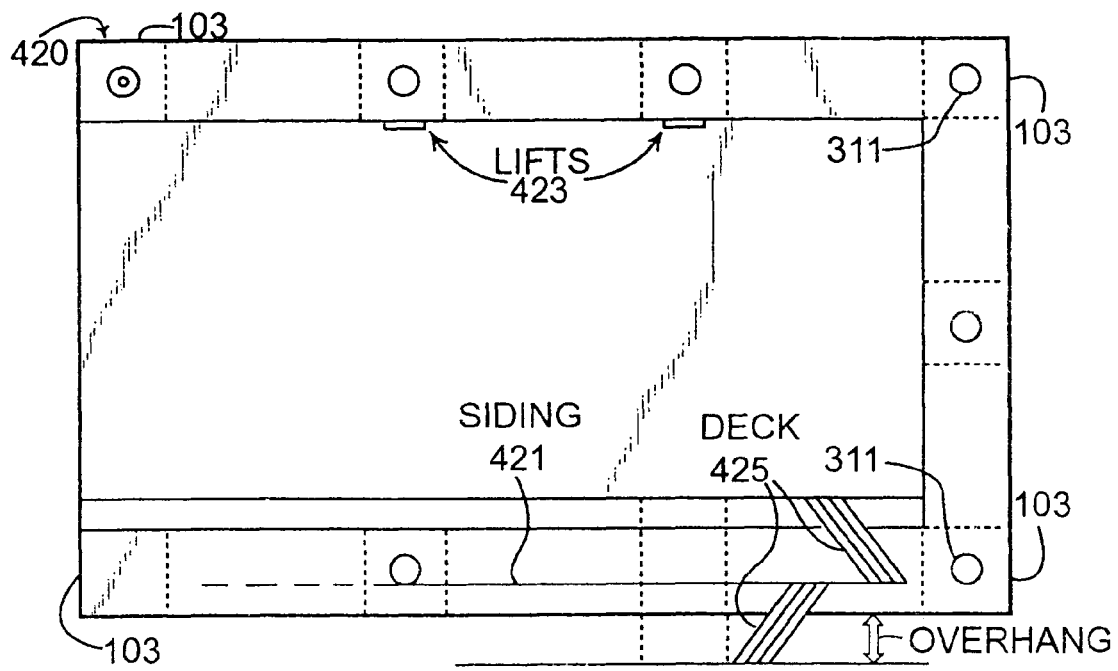
FIGS. 36 and 37 are plan and side views of a conventional fixed boathouse using piles surrounded by concrete boxes to protect the boathouse from ice.
Figure 37:
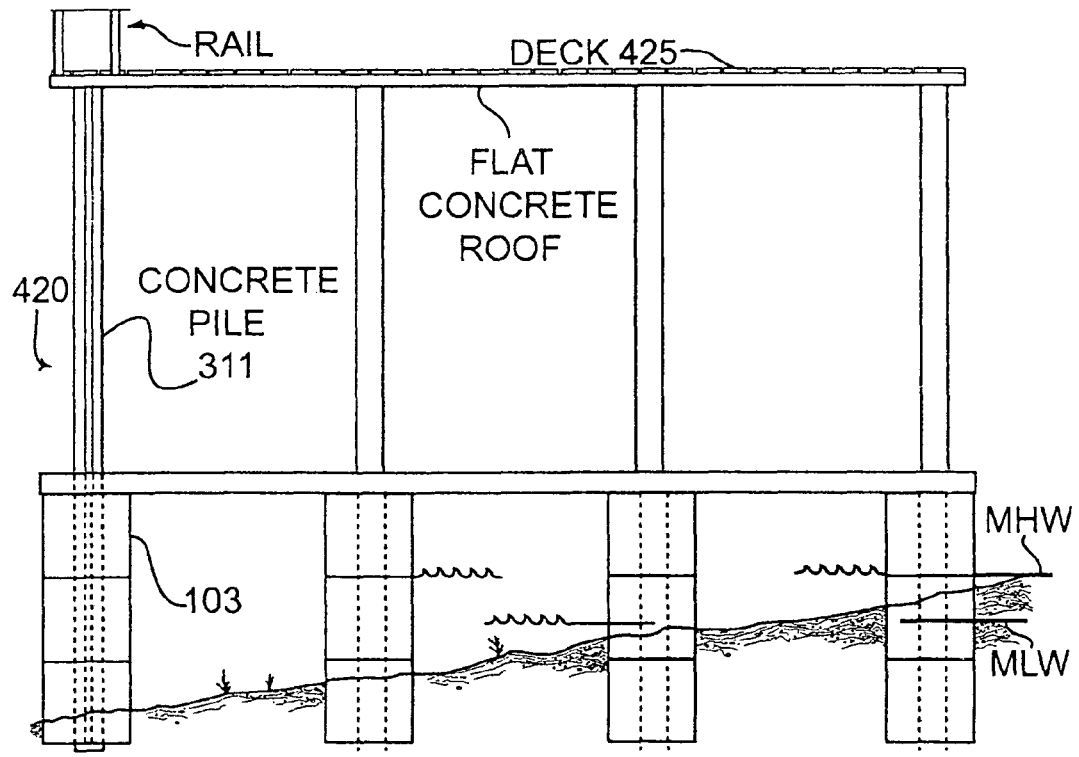

FIGS. 36 and 37 (plan and side views) illustrate a standard fixed boathouse design 420 with a series of concrete boxes 103 added around the supporting piles 311 to protect them from ice and storms by adding mass to the structure and deflecting floating objects. The piles can be any conventional type of wood, metal or concrete, or pipe filled with concrete as discussed in FIGS. 31-33. The concrete boxes which are placed about the piles are precast concrete boxes as described above, which can have either closed or perforated sides, and are approximately square in cross-section, preferably being approximately cubical. The piles are inserted through holes placed in the bottoms (and tops, if present) of the boxes, which are stacked in the positions where the piles are to be driven. Once the piles are driven and the boxes filled with water and sand or gravel, the assemblies for a support for the boathouse (or other structure) that is almost impervious to floating ice or other debris, waves or currents. The boxes are stacked and interconnected by methods discussed above. This boathouse design can provide a relocatable, permanent or temporary facility for pilots, marine patrols, military forces, Coast Guard, and the like. Such precast concrete structures extending from the bottom to the waterline or higher can be employed to protect various types of waterfront structures, such as decks, mills, dam or power plant components and the like.

Figure 38:
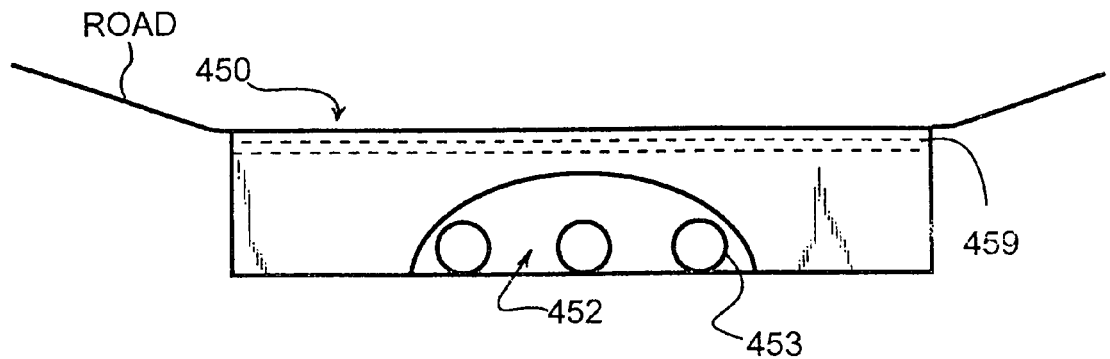
FIGS. 38-40 are side, top and end views of a modified precast concrete box of the invention which is suitable for building bridges.
Figure 39:
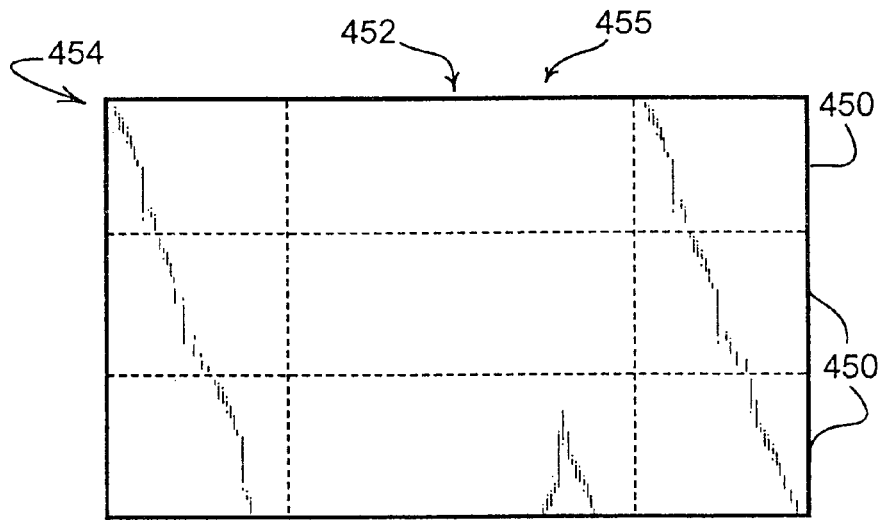
Figure 40:
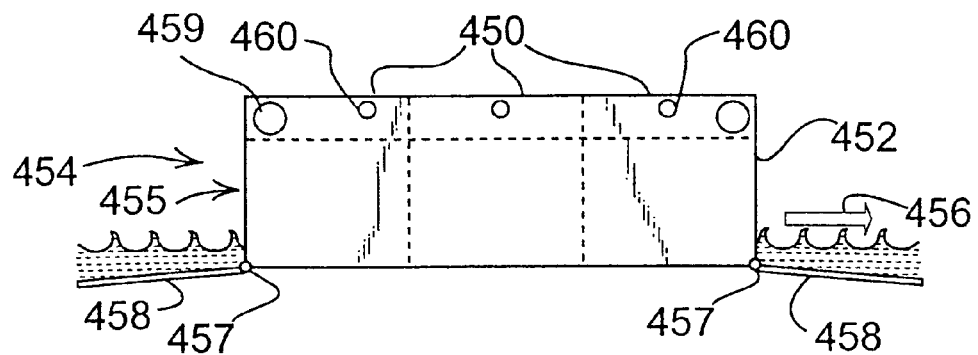

FIGS. 38 to 40 illustrate a precast concrete "bridge box" 450 which is a long, flat parallelepiped in form, including a hemispherical, round, rectangular or oval cutout portion 452 in both of the longer sides. The box can be closed on all sides except where cut out, or can be open on the bottom below cutout 452. Preferably the box is cast with a solid bottom along cutout portion 452, to retain sand which may be added via suitable inlets for ballast. Alternatively, pipes 453 of appropriate number and size can be cast into an otherwise completely enclosed bridge box. FIG. 39 is a side view of a single bridge box 450, while FIG. 40 is a top view of a bridge 454 assembled from three boxes 450 placed side by side to form a roadbed or path, cutouts 452 coinciding to form a culvert 455 for a stream or other running water to pass under.

FIG. 40 is an end view of the bridge of FIG. 39, showing a water flow 456 through the culvert. Preferably concrete antiscour plates 458 are fitted by hinges 457 on both sides of boxes 450 to protect the lower edges where water flow through the culvert. Additionally, large or small pipes 459 and 460 cast into the boxes as conduits provide ready-made and protected means for installing utility lines. Such bridges or structures can be incorporated into shoreline reinforcement systems constructed in accordance with the invention. They can also be used to construct structures requiring bases which will accommodate water flow, such as the boathouse illustrated in FIGS. 31-33. This bridge box structure and method could provide for much cheaper and faster construction of bridges, addition of traffic lanes, or replacement of old bridges over small streams and rivers. They could also be post tensioned over a wider stream or marsh. This design could also be used as a box penetration for storm water to pass from beachfront roads through "boardwalk" boxes and berm boxes to allow storm water to flow to the sea.

Figure 41:
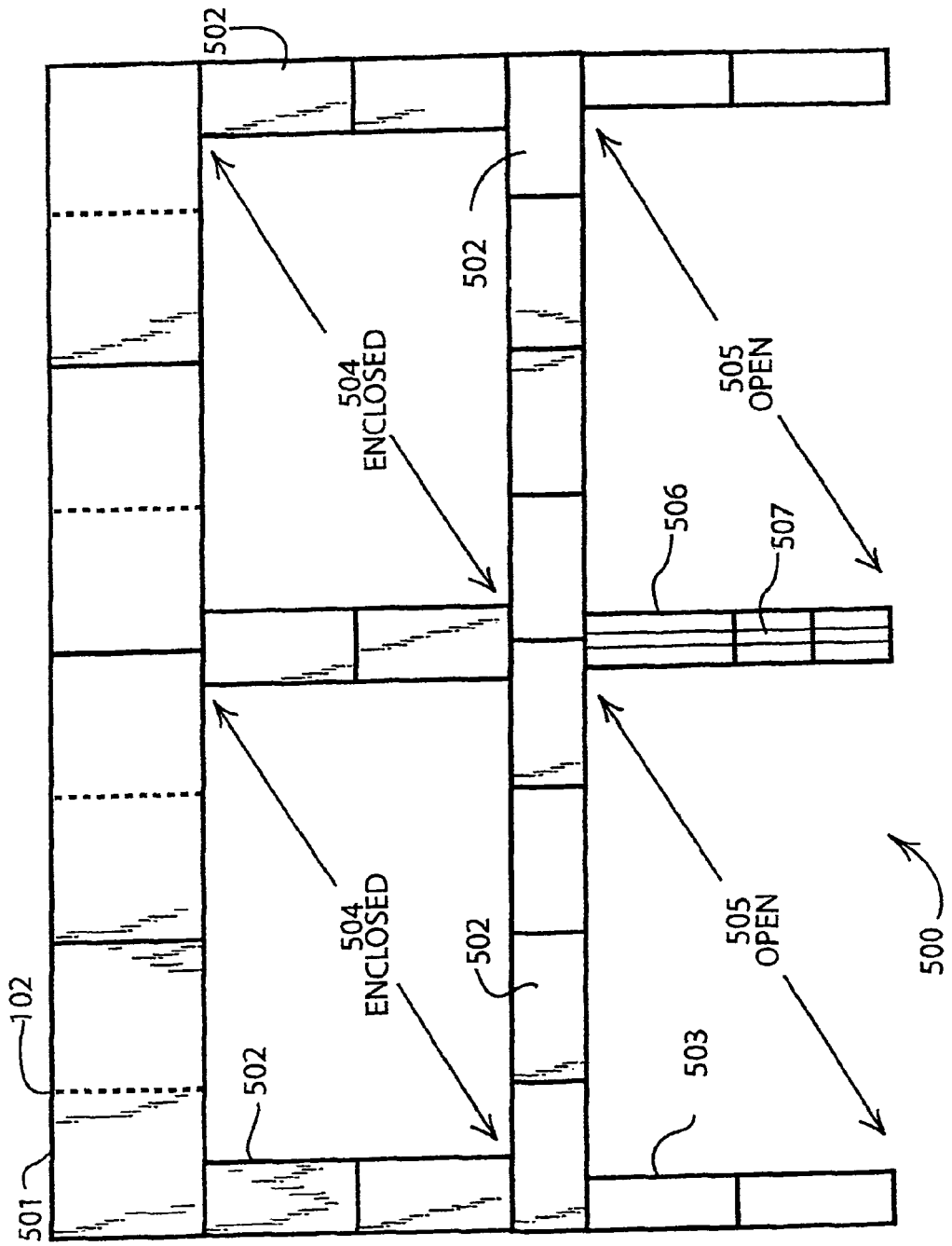
FIG. 41 is a top view of a shoreline reinforcement system assembled from precast concrete boxes of the present invention.
Figure 42:
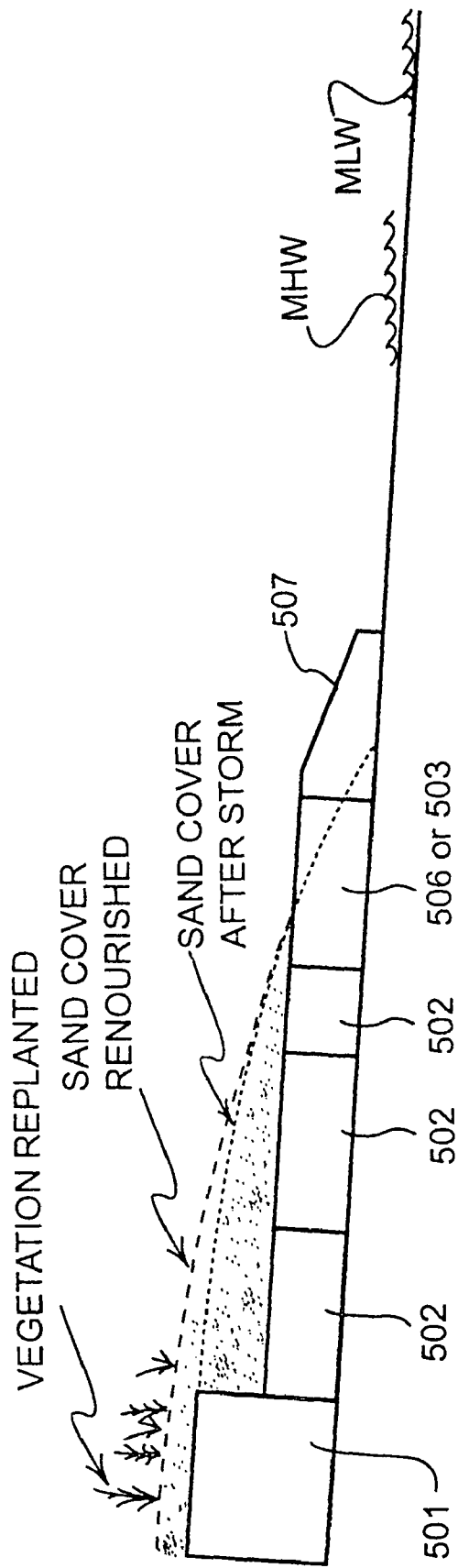
FIG. 42 is a side sectional view of the shoreline system of FIG. 41.

FIGS. 41 and 42 illustrate a shoreline reinforcement system constructed primarily of precast concrete boxes in accordance with the invention. In form and effect, this system resembles the systems disclosed in U.S. Pat. No. 5,697,736 in columns 11/12 and FIGS. 18/19. FIG. 42, the plan view, shows an array of boxes of various sizes assembled along the shoreline to form a seawall and a "backbone" structure for a berm or sand dune seaward of the seawall. These boxes, in suitable sizes and proportions and numbered 501, 502 and 503, will generally be installed by heavy equipment such as cranes or tracked excavators, either from seaward or shoreward, and are filled with sand to provide permanent ballast. They can then be topped with permanent precast concrete covers if desired to form a walkway atop the seawall and prevent scour of the fill inside the box. These boxes can be described as "boardwalk boxes" 501 and are described in detail and illustrated in FIGS. 10-12. The boxes can take the form of rectangular parallelepipeds, typically about eight to twelve feet wide by twenty to forty feet long by eight feet high, or can be nearly cubical units half that long. The large boxes 501 shown are segmented (with partitions 102) and can be about eight feet square by forty feet long. Using boxes in at least two lengths facilitates their installation in lengths suitable for the construction site and local conditions. Also, as described above, it is convenient for shipping to use intermodal units having lengths of ten, twenty or forty feet.

Extending laterally down the beach from the seawall are at least two arrays of "berm boxes" 502, which can be about four feet high by eight feet wide by twenty feet long, to provide berm groins and closed berm cells 504 much like those employed in the systems in the patent cited. Smaller box groins 503 form open groin cells 505. These may be open boxes which are filled with sand and then fitted with tops, or if local tidal conditions permit, can be floatable boxes which are floated into position and then sunk in place, as described above. Another lateral row of berm boxes 502 is installed perpendicular to the berm groins and approximately parallel to the seawall, filled with sand and left open or covered. The beach spaces between the berm groins and lateral rows of boxes are partially filled with sand and preferably covered with filter cloth and articulated concrete mats as disclosed in the patent cited, in columns 10/11 and FIGS. 16/17, then covered with more sand.

Alternatively, the spaces can simply be partially filled with gravel, rip-rap and/or sand, and local winds, tides and waves allowed to deposit additional sand, etc. with time. The result will be a stable structure that prevents erosion of the shoreline and actually tends to build up sand and gravel to form additional beach under most conditions. Storm protection is also provided for the boardwalk (or seawall) boxes and the landward buildings and other structures.

Additional smaller groins 503 can be added to seaward of the lower lateral row of boxes described above. Such groins 503 can be formed of arrays of at least one "beach box" 503 (which can be about four feet wide by four feet or 2' 8" high and ten or twenty feet long) at the right and left sides, as described above for the berm boxes, and filled with sand or gravel for ballast. Such boxes are preferably set from the land, or if intended to extend into the sea, floated into position and sunk in place for installation. In addition, or as an alternative, T-walls 506 and beveled T-walls 507 can be used as shown in the center and described in the patent cited, in column 7 and FIGS. 8, 9 and 18. Such T-walls could be used for the entire pier-groins as disclosed in the patent cited, or simply to provide the seaward components of this system (in which case the beveled ends of the outward T-walls minimize potential damage to boats and the like which approach closely). In general, with no beach existing, it will be easier to install beach boxes where they can be floated into position, so they are preferred for most components of the systems of the present invention. With an established beach, installation from landward is preferred. The double T or "pi" units of FIG. 3 can also be used as components of such shoreline systems, arranged parallel and/or perpendicular to the shoreline.

FIG. 42 shows the system of FIG. 41 in side view, the entire structure lying above mean high water, and the level of sand expected to build up after storms and after renourishing by normal tidal action or by artificial methods. This system can be installed before renourishing an eroded beach to retain a large percentage of the new sand, which might otherwise be washed out to sea during a storm. Even if some of the sacrificial sand is lost, these massive interconnected boxes and other structures are not easily moved by storm waves. However, if necessary, the boxes can be disconnected and relocated, using suitable heavy equipment.

Figure 43:
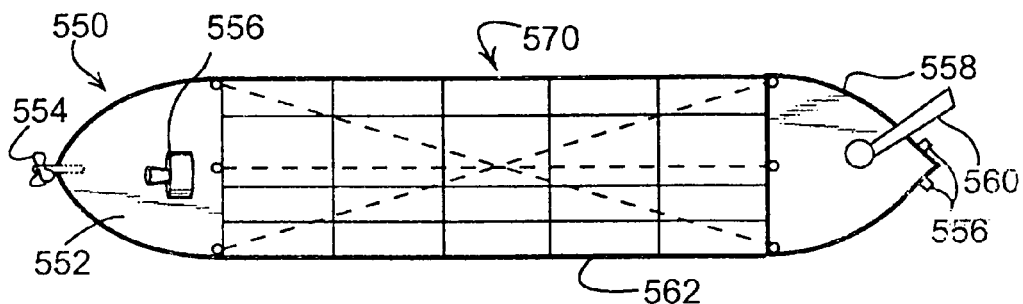
FIGS. 43-45 are side views of a ship designed to incorporate a module assembled of precast concrete boxes of the invention as the parallel midbody of the ship in order to transport same.
Figure 44:
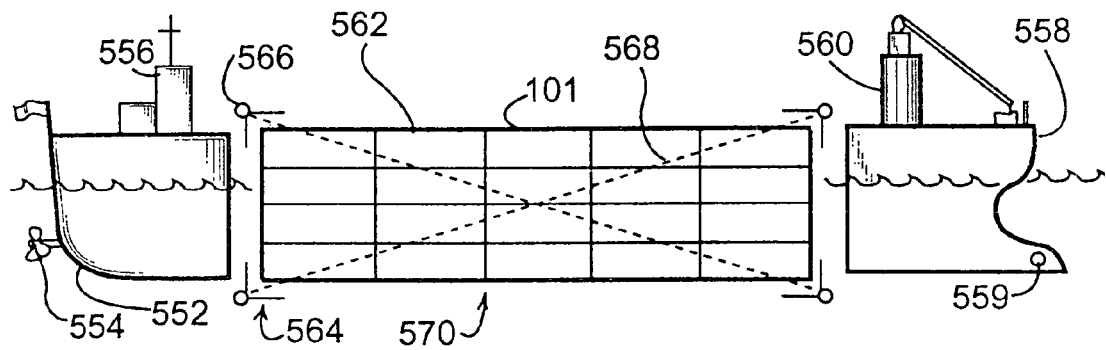
Figure 45:
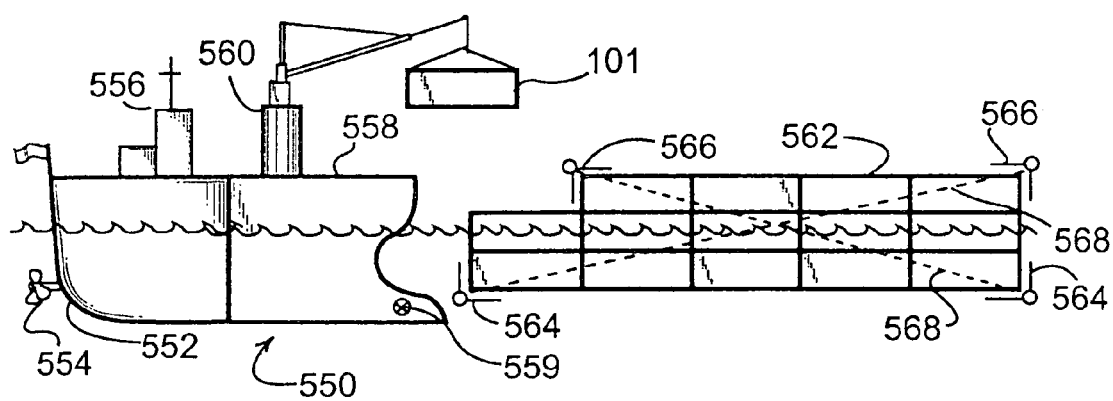

FIGS. 43 to 45 illustrate a novel vessel 570 and method for transporting and installing precast concrete boxes of the invention to locations for installation to form shoreline structures, breakwaters and the like. Plan view FIG. 43 and side view FIG. 44 show a vessel 570 comprising two portions—bow 558 and stern 552. Stern portion 552 comprises the conventional propulsion system (not shown), at least one propellor 554 and pilot house 556 with appropriate controls. "Thruster" type propulsion can also be provided to improve maneuvering. Bow 558 comprises storage spaces for supplies, at least one anchor (not shown) and a crane unit 560. Both sections have flat vertical surfaces comprising primarily watertight bulkheads with a minimum of openings which can be secured to permit them to float independently. Bow 558 and stern 552 can be fastened together as shown in side view FIG. 45 and secured by appropriate mechanical means such as larger twistlock stackers (as shown in FIG. 28), turnbuckle locks, bolts, cam locks and the like. Thus secured, vessel 550 can travel under its own power to a port where a stacked and securely interconnected floating array of precast concrete boxes of the invention can be attached between the bow and stern sections for transportation.

As shown in FIG. 44, a large group of such boxes 101 can be stacked and grouped together to form a box module 562, which is fastened together under longitudinal and lateral tension by a tensioning system comprising, e.g., corners 564 and 566 and cables 568. Similar locking connections on the corner plates permit the array of boxes to be secured to the bow and stern sections of the vessel. Once assembled, box module 562 is moved, from an onshore assembly site (e.g. on a pier, wharf or ramp) by large crane or other suitable means into the harbor waters and floated into deeper water alongside a pier or within the harbor where the vessel may freely enter. Such a module can be maneuvered around such restricted waters using mini-tugs (e.g., converted military landing craft) or other suitable small craft and suitable attachment points which are provided on the outside surfaces of the module (not shown here). With the module held in place by such tugs, anchored or moored to buoys, vessel 550 can be brought alongside, bow section 558 detached from stern section 552 and stern section maneuvered against the rear surface of the module 562, using propellor 554, thruster propulsion 559 or tug assistance if necessary. Contemporaneously, tugs or other craft hold bow section 558 in position until stern section 552 is attached to module 562. The vessel's anchor can be used to anchor bow section 558 during this period if desired, provided that an auxiliary power source is provided to power the anchor windlass. Then bow section 558 is maneuvered into position against the front surface of module 562 by tugs and secured in place. The same systems used to fasten the bow and stern sections of the vessel together can be used to attach the bow and stern sections to the array 562 of boxes. The result is a "stretched" vessel 570 (shown in FIGS. 43 and 44 assembled, FIG. 46 in disassembled state) which can travel under its own power to the location where the boxes are to be disassembled and/or installed.

In addition to transporting and unloading such floating arrays of concrete boxes as described above, the vessel of the invention can be used to carry a variety of floating objects or arrays of objects, provided they are sufficiently buoyant, have appropriate proportions and can be fitted with attachment devices to attach them securely to the two hull sections of the vessel. Various types of containers and tanks, floating bridges, pontoons, caissons and other floating construction components can be incorporated in the vessel and transported. This could be of particular value when transporting and installing components to form structures in areas of military landings. Furthermore, such a vessel could be constructed to have the appropriate size, proportions and attachment fittings to transport floating drydocks, whether commercial or military. Since floating drydocks have high freeboard and limited stability at sea, transporting them as the midship section of such a vessel could provide a faster and safer method of overseas transport for these valuable ship repair vessels.

FIG. 45 is a side view showing the vessel 550 with bow section 558 and stern section 552 again connected together, box module 562 having been removed by reversing the sequence of steps described above. Thrusters or mini-tugs (not shown here) can be carried on the forward deck and/or in a forward hold and offloaded using crane 560 to facilitate this process. In FIG. 45, a portion of the module tensioning system has been loosened and crane 560 is lifting the first box 101 to be offloaded. Depending upon the depth of water near shore and the positions where the boxes are to be installed, the vessel and crane may be able to deposit the boxes in the water directly above or near the installation point, or near the installation point ashore. Alternatively, the boxes can be placed into the water near shore and maneuvered into installation position by mini-tugs or other suitable craft.

FIGS. 46 to 48 illustrate another method of transporting and installing arrays of precast boxes of the invention. FIG. 46 is a side view of a barge 600 or similar vessel floating in water 602 over bottom 610 where a breakwater is to be installed. Vessel 600 can be self-propelled, in which case propellor 620 and associated propulsion systems are provided. Precast concrete boxes 604 are connected by stainless steel cables 606 (or other suitable mechanical means) and arranged on deck 612 in position to be unloaded as an array via ramp 608. The boxes can be the special perforated and slotted "breakwater boxes" disclosed in U.S. Pat. No. 5,697,736 and illustrated herein in FIG. 4 (having thin concrete knockouts or plugs), but can also be open boxes as in FIGS. 10 to 12 or closed boxes fixed with flood/drain and blow/vent valves as illustrated in FIGS. 16/17. Ramp 608 can be held in position during operations by using suitable mechanical restraints such as cables or hydraulic rams, as well as floats.

The array of boxes can be unloaded from the barge by dropping a heavy anchor 614 which is attached to the array by extended cable 607, then backing the barge (by self-propulsion or tug, not shown here) to exert tension on cable 607, as illustrated in FIG. 47. Barge 600 will require a smooth, level deck upon which the array of boxes can be arranged, and providing rollers or lubrication before the boxes are loaded and connected would be helpful. FIG. 47 illustrates the array of boxes 604 floating on the surface 602 and interconnected by cable 608 (not seen here), with the boxes pulled closely together. One end of cable 607 is still held by anchor 614, but the array of boxes has been moved closer to that anchor by winches or boats to bring it near the point where the breakwater is to be installed. At the other end of the array, cable 606 passes through block 618 on anchor 615, which was dropped from the barge deck after the last box slid down ramp 608. Clamps or other mechanical restraints 616 and 617 position the array of boxes at preplanned portions of cables 606 and 607 after the desired amount of tension on cable 606 and the desired position of the array is attained. This is accomplished by applying force to the barge end of cable 606 via a winch (not shown) or other appropriate device.

When the array is in optimum position for installation as determined by navigational or global positioning system fixes, all boxes are sunk sequentially or simultaneously by remote control or manual means, and allowed to settle into their installed positions to form a submerged breakwater or reef 620 as shown in FIG. 48. Cable 606 can then be simply cut from the barge deck, or if desired, a diver can be employed to secure cable 606 to block 618 on anchor 615 and the excess cut, to provide extra security for the breakwater. As discussed in the patent cited, at columns 8/9, such breakwaters can be very beneficial in reducing or eliminating the presence of swells in harbors which are at least partially exposed to open water. As an alternative, the interconnected boxes can be left floating to mitigate passing wave energy.

Figure 49:
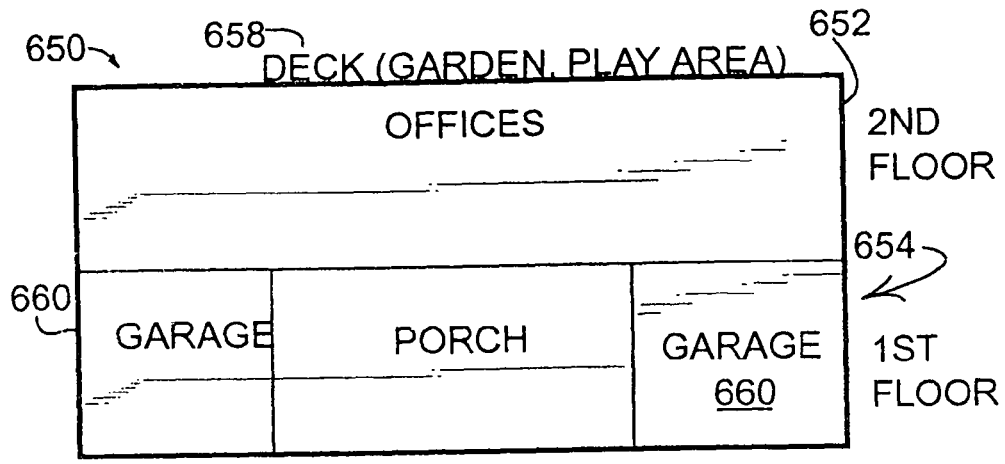
FIGS. 49 and 50 are end and plan views, respectively, of a dwelling structure assembled from precast concrete boxes.
Figure 50:
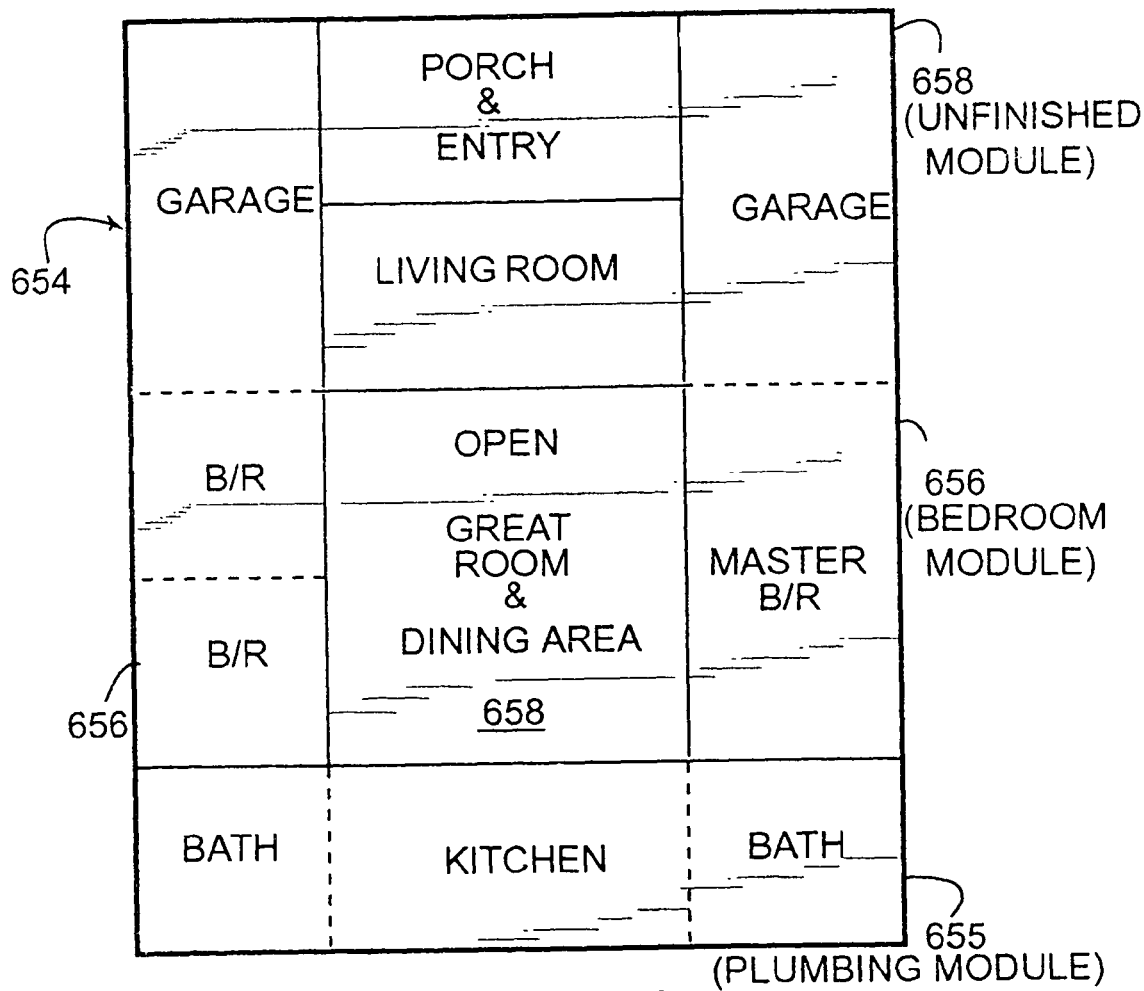

FIGS. 49 and 50 illustrate how the precast, intermodal concrete boxes can be used to construct buildings for use either above or below ground or water. Dwelling structure 650 includes first floor 654 and second floor 652, all constructed of precast concrete boxes of various standard sizes and proportions, being interconnected and stacked to form the two (or more) stories. The concrete boxes are amenable to intermodal transportation as well as lifting and placement on the ground (or actually in water, if the bottom units are waterproof) or stacking, as illustrated in FIG. 49. Doors, windows, open walls, conduits for utilities, and the like (not shown here) can easily be included for use in these standardized boxes and/or cut during installation/assembly. The walls of the precast boxes in effect become interior and exterior walls, floors and ceilings of the various rooms or spaces contained within the structure. Because the concrete is strong, resistant to liquids and vermin, it can be used in wet areas, acidic soils, underground, on water, under water and in other challenging environments. It is ideal for constructing strong, relocatable structures, such as for military or security areas. Such precast boxes can be ideal for constructing bunkers, fallout shelters, underground or underwater storage facilities or earth-sheltered homes. FIGS. 49 and 50 illustrate the employment of precast concrete of various sizes and proportions suitable for forming various typical rooms of a combined dwelling/office structure.

Some applications of precast concrete boxes of the invention for shellfish habitat are illustrated in FIG. 51. As described above, in many areas, the cultivation of shellfish such as oysters and mussels has been adversely affected by pollution and silting of bottoms of bays and other bodies of water, which may be exacerbated by harvesting techniques which disturb bottom sediments. To permit the cultivation of shellfish above the bottom in such areas and facilitate harvesting without aggravating such problems, FIG. 51 provides a precast concrete box 700 with enclosed sides containing holes 702 and/or slots 704. As illustrated in FIG. 4 above, these openings can be at least partially filled with breakable, thin concrete sections to provide knockout areas to facilitate the sinking of the boxes. Alternatively, removable plugs (not shown here) can be temporarily installed in the holes or slots to allow the boxes to be floated into place, then removed for sinking the boxes in place. The boxes are provided with removable concrete tops 710 which can be held in place with pins 708 passing through holes 706 in both covers and the corners of the boxes. Shellfish are to be cultivated on the covers and sides of the boxes when sunk into place, thus elevating the shellfish at least the height of the box (perhaps 4 to 8 feet) above the bottom where they are removed from silt and pollutants and exposed to currents carrying more nutrients and oxygen. The boxes preferably have dimensions and proportions which permit intermodal transport and the covers are provided with various types of projections or roughened surfaces to promote adhesion by shellfish spat. The working surfaces of the covers are turned inward for convenience in transport, then reversed and secured in place before the sinking and installation of the boxes. In FIG. 51, cover 710 is covered with at least one layer of projections 712 (here, three layers) having the form of rectangular parallelepipeds, which can be laid down in criss-cross patterns as shown. In addition to producing boxes and covers of concrete comprising crushed bivalve shells, preferably oyster shells, the projections 712 can be cast or otherwise produced of similar materials. The objective is to provide rough, porous surfaces which are hospitable to shellfish spat, with projections which are spaced appropriately to foster rapid and productive growth of the shellfish to harvestable size. As an alternative or addition to such projections, the covers can be cast to contain large fragments of broken bivalve shells, as shown in FIG. 52 as 716 on concrete cover 710. This in itself could provide an ideal oyster bed, since oyster larvae have evolved preference for setting on other oyster shell, according to SCORE's description of "Oyster shell Recycling" at http://score.dnr.sc.gov/deep/phop?subject=1 (Visited Jul. 24, 2010). However, oyster shells and comparable materials are in short supply and must be conserved. Since "Adult oysters and even shells of dead oysters emit chemicals that attract oyster larvae," as stated in the same article, the addition of crushed oyster shell or chemical additives providing the same attractant properties to concrete can make it attractive and hospitable to setting oyster larvae. Also shown in FIG. 52 are rectangular projections 714 which are cast or attached perpendicular to cover 710.

Figure 53A:
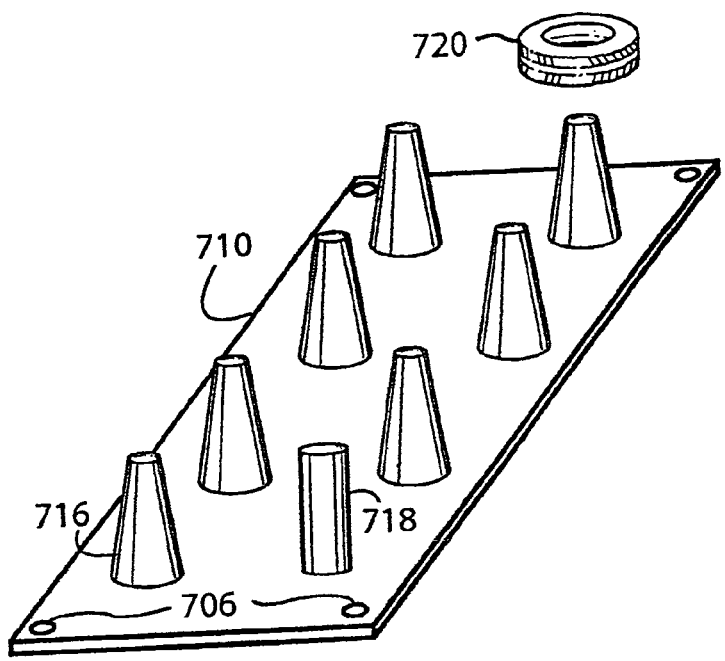
FIGS. 53 and 53A are perspective views illustrating another version of shellfish habitat with removable top, including means for hoisting the assembly from underwater.
Figure 53:
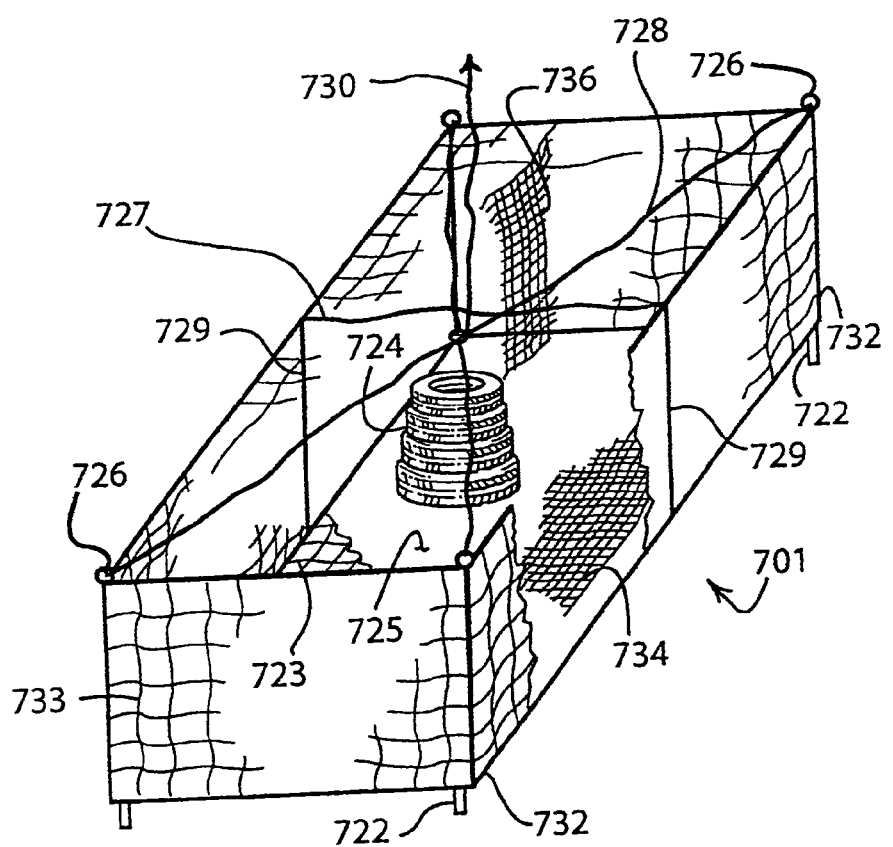

FIGS. 53 and 53A illustrate another type of shellfish habitat, with FIG. 53 schematically illustrating a meshwork container 701 with attachment points 726 at the upper corners for attaching bridle cables 728 and hoisting cable 730. Pins 722 are fitted to the lower corners so that the container can be mounted atop a precast concrete box such as box 700 of FIG. 51, or any suitable container or platform which will elevate the habitat to the proper level above the bottom. Any suitable mesh or openwork material can be used to construct containers 701 about a suitable framework including rigid components 732, including expanded metal, heavy wire mesh and the like. For durability, meshwork of synthetic polymeric materials may be preferred. Container 701 is to be filled with suitable objects for the adherence of shellfish spat, such as used tires, optionally filled with broken shells, stainless steel wire mesh structures, plastic pipe reinforced with steel, fragments of concrete, and the like, any of which can contain bivalve shells or mature oysters. A precast concrete top 710, much like that shown in FIG. 52, is provided. Various types of projections, including those shown in FIGS. 51 and 52, can be used. FIG. 53A illustrates projections 716 and 718, which are cylindrical and conical, respectively. Additional components can be mounted on these projections, such as used tires 720, optionally filled with bivalve shells, stainless steel wire mesh structures, etc.

Since container 701 is much lighter than a concrete box, even when filled with structures for shellfish culture, hoisting and bridle cables 730 and 728 can be used to lift the entire container, cover and all, or alternatively, similar cables can be connected to lift cover 710 independently. Once either component is hoisted clear of the water, the contents can be hosed off to remove any silt or sand and the assembly shaken or vibrated over a vessel's deck or hold to dislodge oysters or other shellfish (e.g., mussels) for harvest.

The precast concrete components of the shellfish habitats described above should be produced from types of concrete which are durable, nontoxic and compatible with shellfish culture. In some cases, it may be desirable to use "eco-friendly" types of concrete which absorb carbon dioxide and form carbonates in the process of curing, such as produced by the Australian company TecEco Pty. Ltd. and disclosed in various sources, including, e.g. the company website, www.tececo.com.

Bivalve shells of any type can be used in the concrete mix, although oyster shells are preferred when available, particularly for the exposed surfaces of the structures. Other suitable types of bivalve shells include those of mussels and clams, as well as other sea shells such as conch, marine snails and other species.

Various changes and modifications to the presently preferred embodiments will be apparent to those skilled in the art. Such changes and modifications may be made without departing from the spirit and scope of the present invention and without diminishing its attendant advantages. Therefore, the appended claims are intended to cover such changes and modifications, and are the sole limits on the scope of the invention.

I claim:

1. A shellfish habitat comprising a precast concrete box with four sides and a flat bottom, cast from a concrete comprising crushed bivalve shells, said box having a series of at least one of holes or slots in the sides thereof, the holes or slots being temporarily plugged with knockout sections to facilitate sinking said box in a body of water, and a removable concrete top.

2. The habitat of claim 1 wherein said concrete top has bivalve shells cast into its outer surface to be exposed to the water when said habitat is sunk.

3. The habitat of claim 2 wherein said concrete top additionally comprises concrete projections affixed to said surface to be exposed to water when submerged, said projections being sized and spaced to encourage shellfish implantation and growth, and said concrete top being adapted to being emplaced upon said box with said projections facing inward for transport and for being removed after emplacement for harvesting of shellfish.

4. The habitat of claim 3 wherein said projections have forms selected from the group consisting of cylinders, conical sections and rectangular parallelepipeds.

5. The habitat of claim 3 wherein said concrete projections comprise crushed bivalve shells.

6. A shellfish habitat comprising a mesh container with a rigid frame forming four sides and a flat bottom and a removable cover cast from a concrete comprising crushed bivalve shells, said cover comprising a plurality of concrete projections affixed to the outer surface to be exposed to water when said habitat is assembled and sunk in a body of water, and further comprising hoisting connections to hoist at least one of said container and said cover for harvesting shellfish adhering to said habitat.

7. The shellfish habitat of claim 6, further comprising a plurality of objects suitable for shellfish culture within said container.

8. The shellfish habitat of claim 6 wherein said cover comprises broken bivalve shells cast into the outer surface to be exposed to the water.

9. The shellfish habitat of claim 6 wherein said concrete of said cover comprises at least one additive attractive to oyster larvae.

* * * * *